United States Patent Office 3,377,730
Patented Apr. 16, 1968

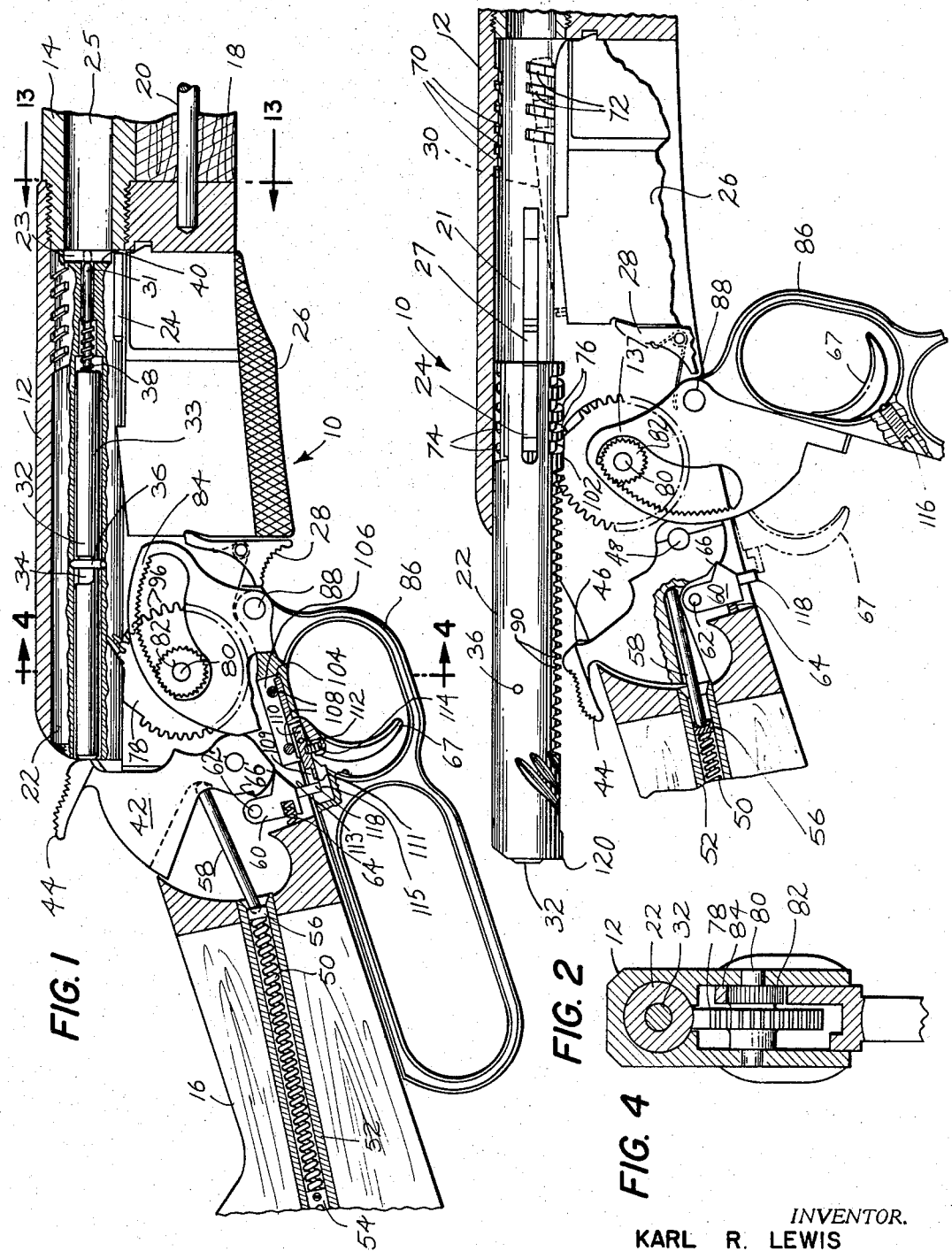

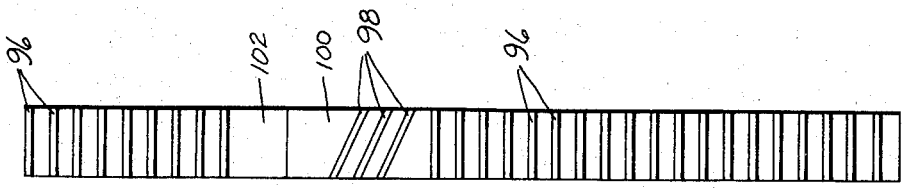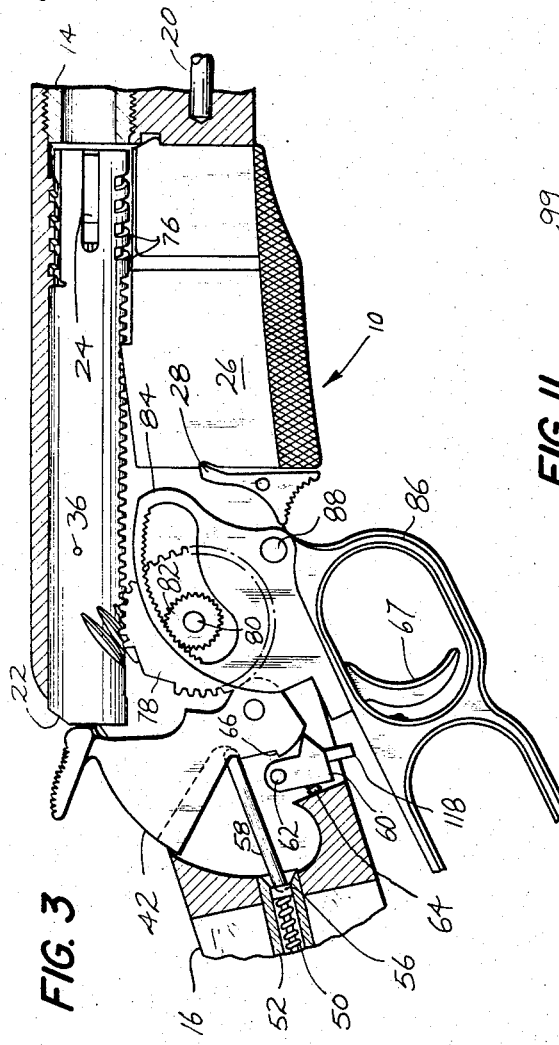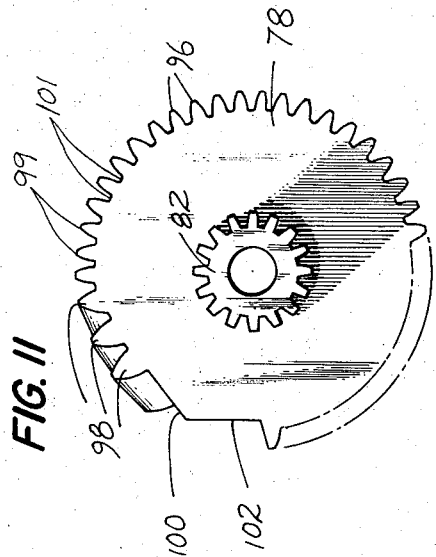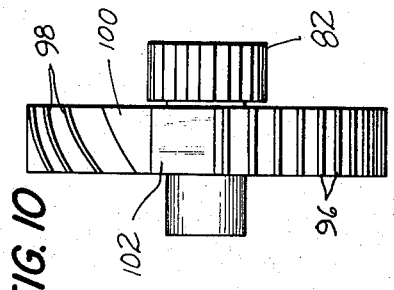

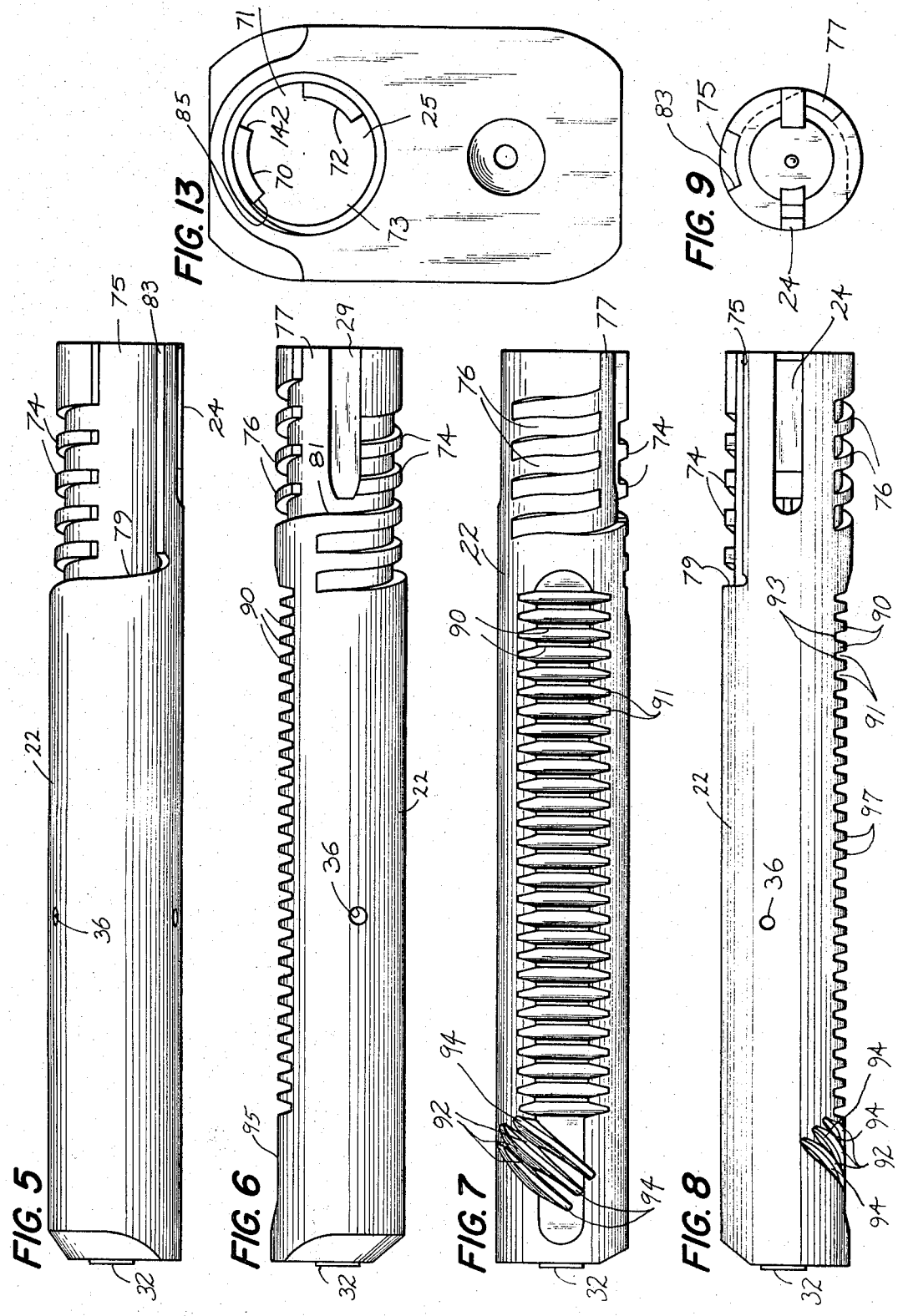

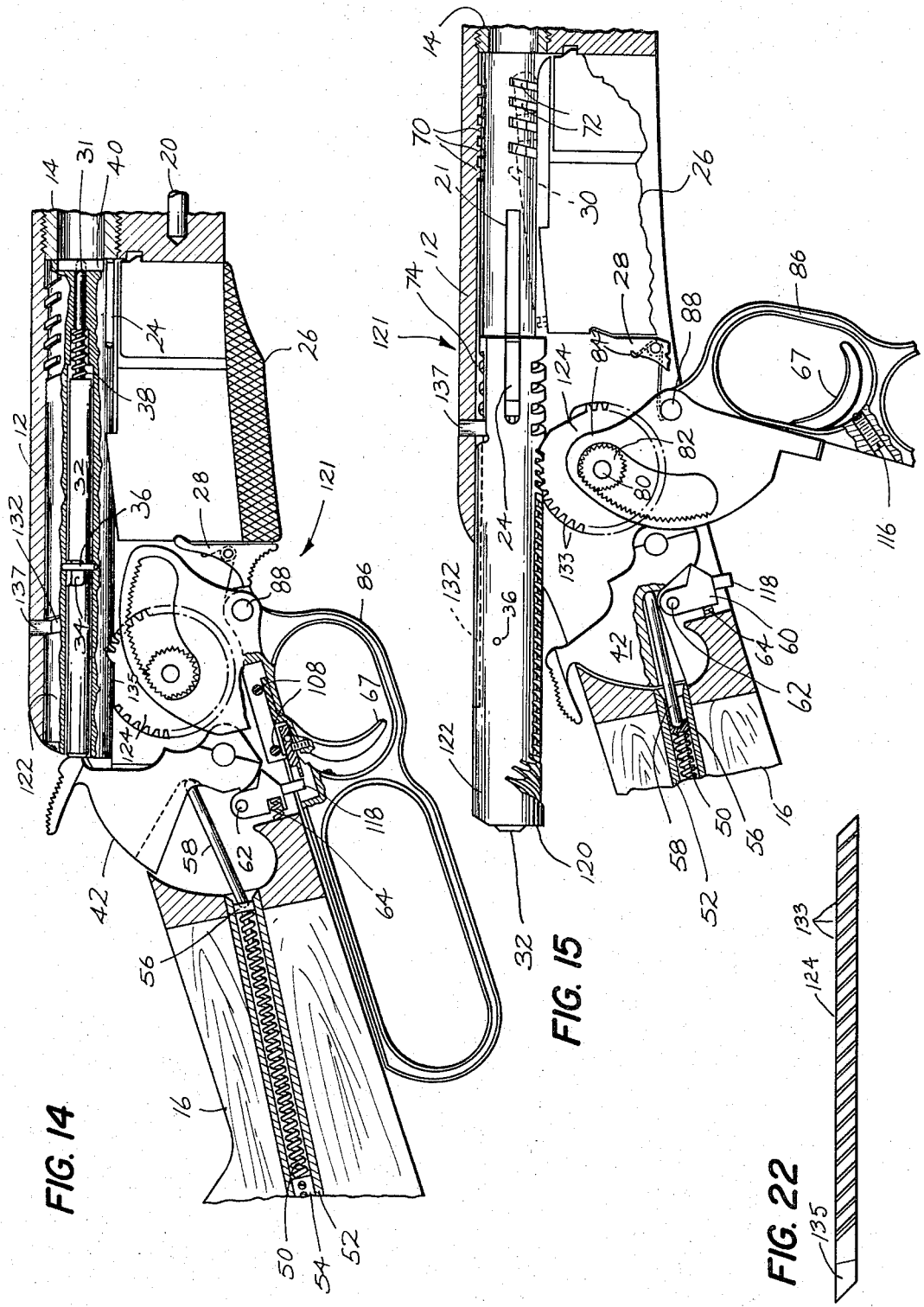

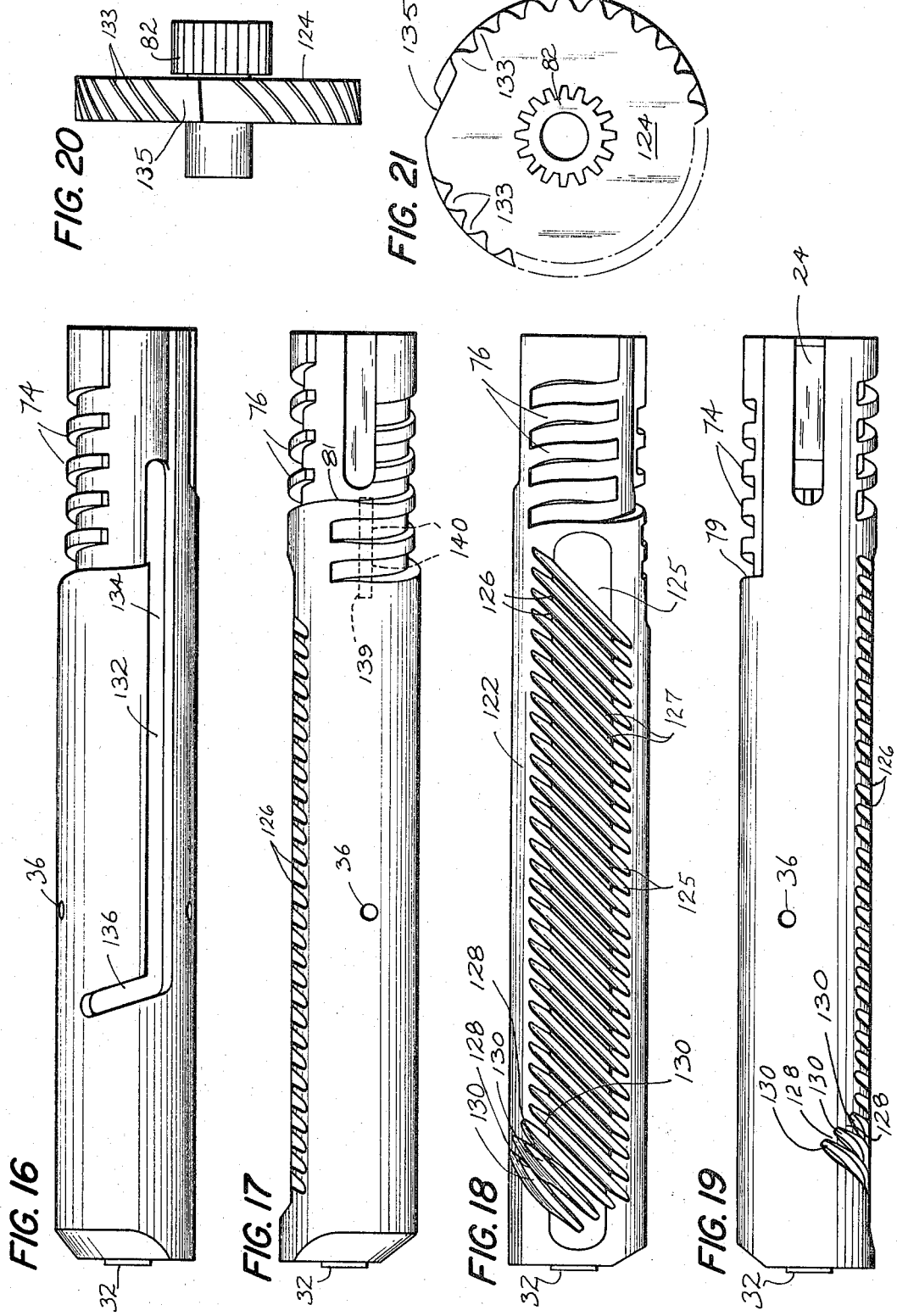

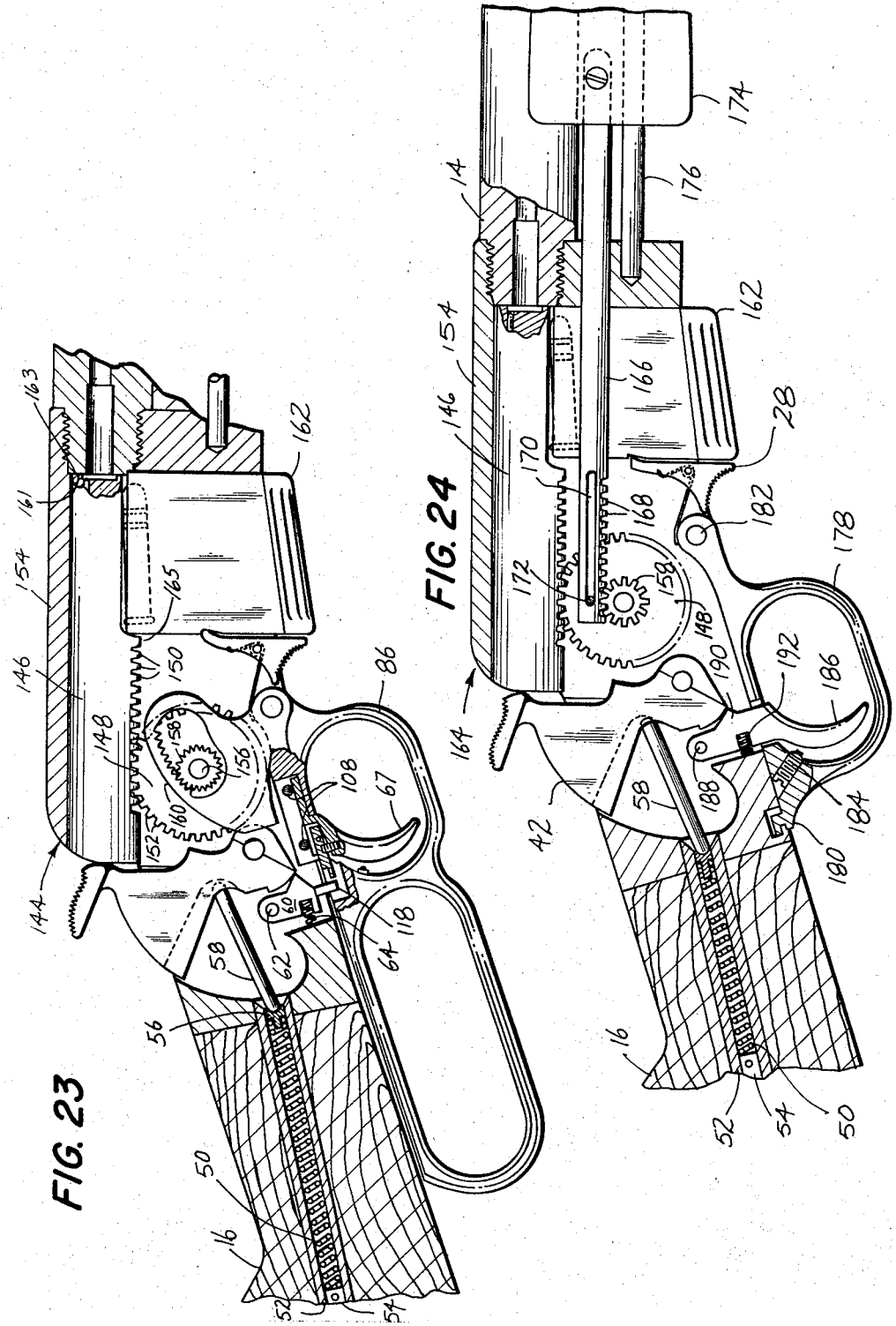

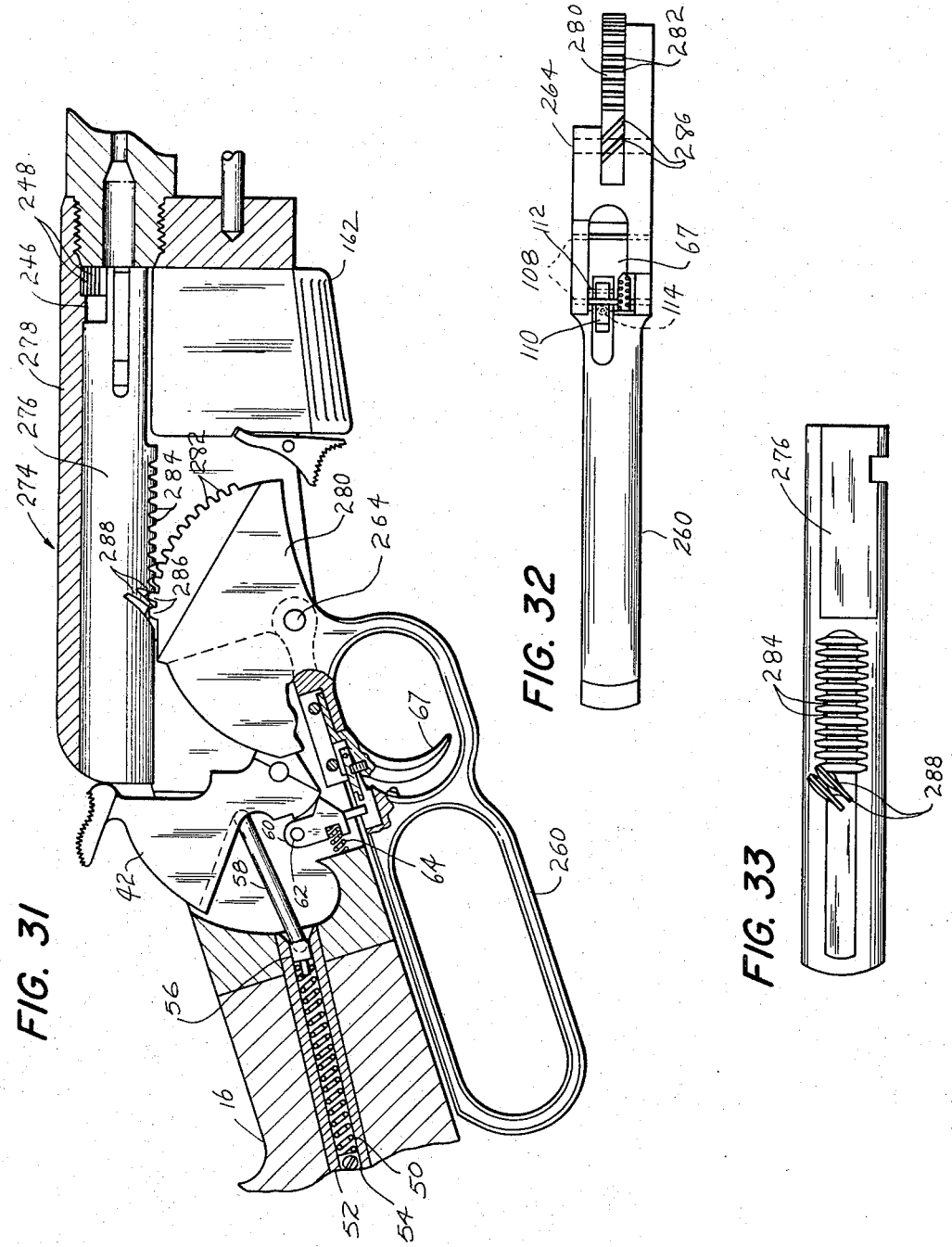

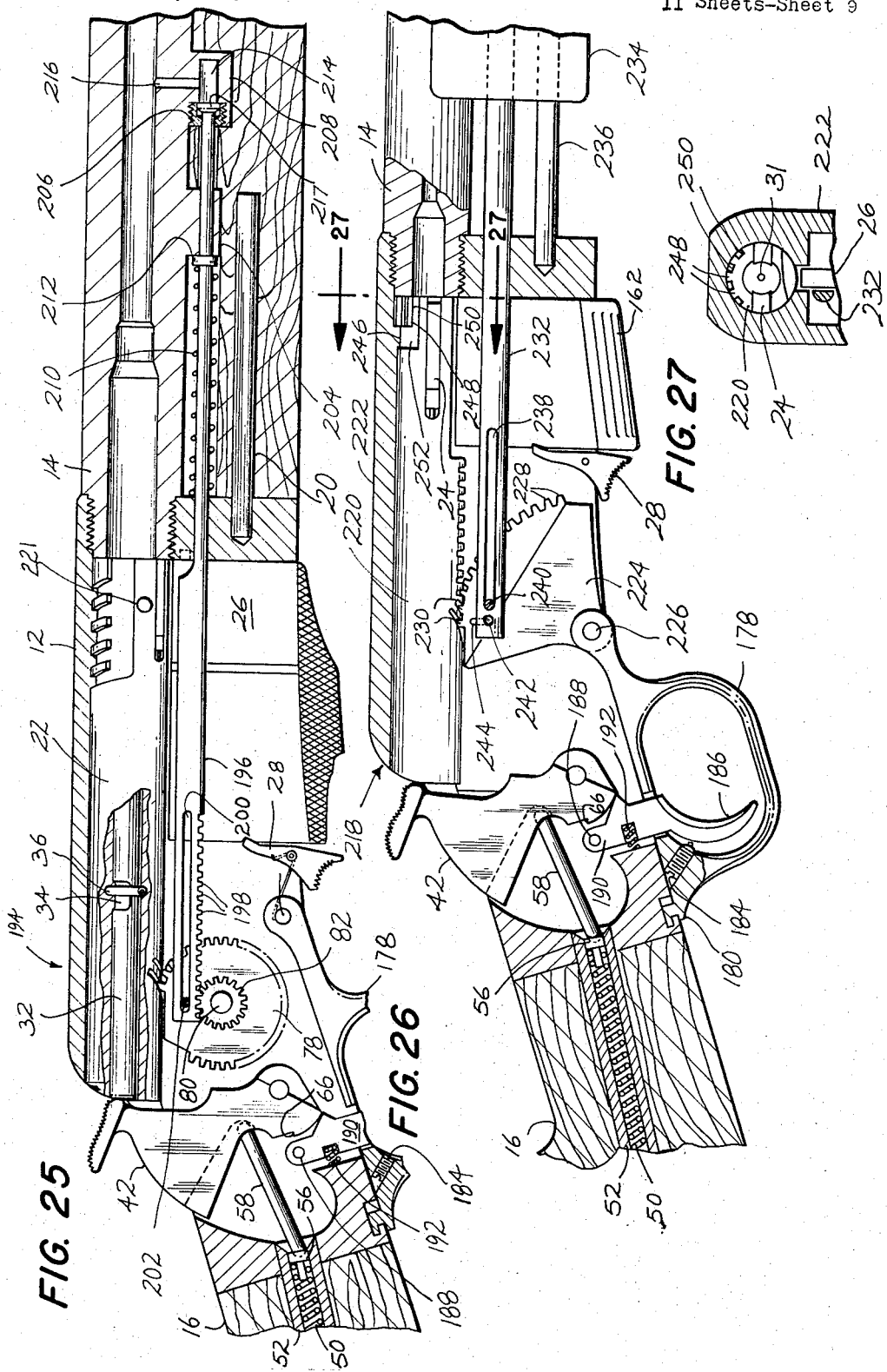

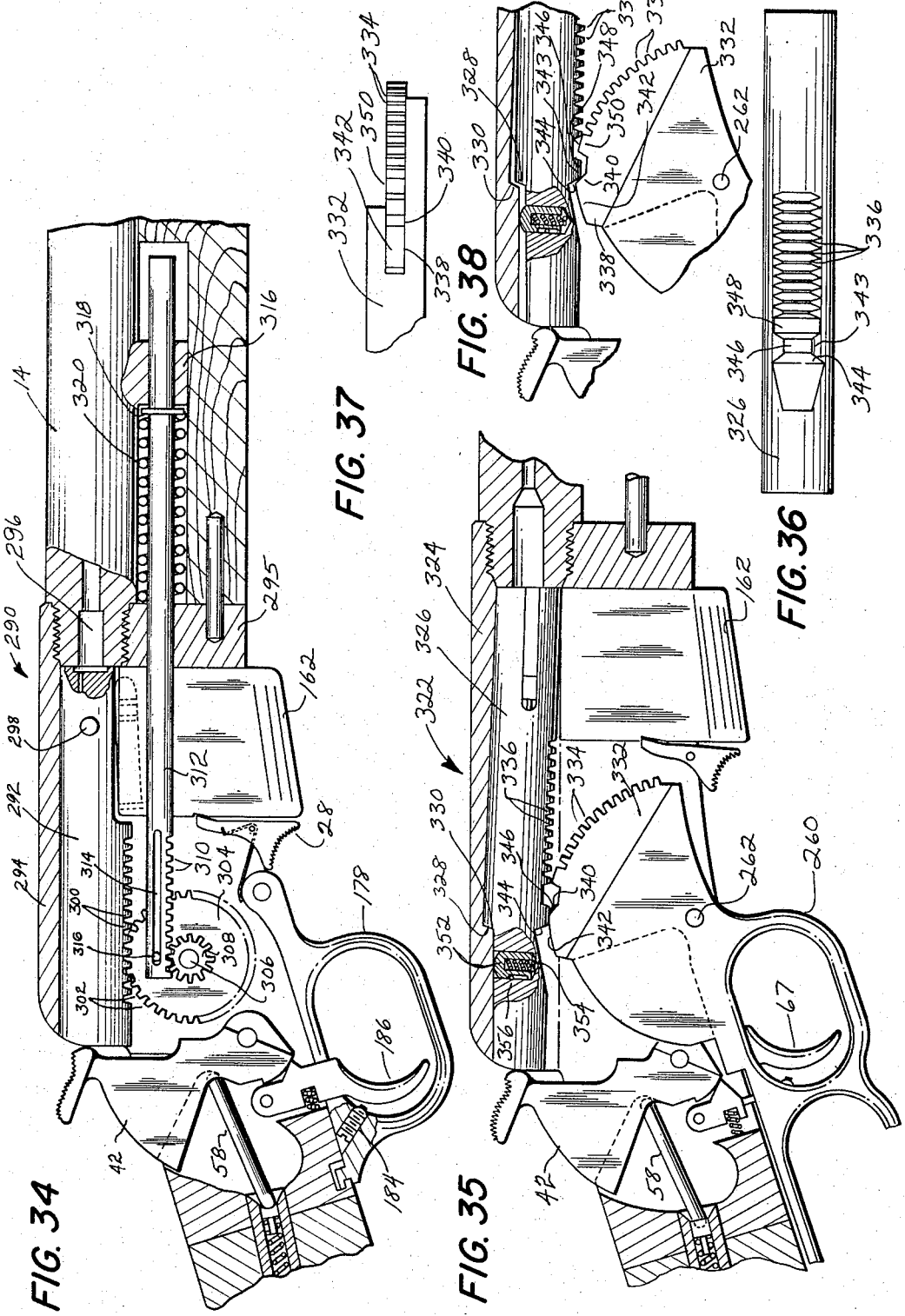

3,377,730
BOLT MECHANISM FOR BOLT ACTION TYPE FIREARM AND MECHANISM USED THEREIN FOR CONVERTING ROTARY MOTION TO RECIPROCATING AND ROTARY MOTION
Karl R. Lewis, 77 Olney Road,
Wethersfield, Conn. 06109
Continuation-in-part of application Ser. No. 524,763, Feb. 3, 1966. This application Dec. 16, 1966, Ser. No. 609,979
35 Claims. (Cl. 42—16)

ABSTRACT OF THE DISCLOSURE

This application discloses a number of bolt action type firearms and in general is specifically directed to the mechanism for moving the bolt, and associated parts of the firing mechanism, of such a firearm relative to the associated barrel and housing for bringing cartridges into and out of a firing position and for otherwise conditioning the firearm for proper operation. The mechanism for operating the bolt consists of gear teeth formed on a part of the bolt and a rotary gear element meshing with such bolt teeth. Various different types of gear elements, and ways of driving the same, are disclosed, as are various different forms of gear teeth, or gear teeth in combination with other elements, for reciprocating the bolt longitudinally as well as moving it in a second direction, angularly or radially, to lock and unlock it when in one limit of its longitudinal movement, as a result of continuous rotary motion of the gear element.

Related application

This application is a continuation-in-part of application Ser. No. 524,763, filed Feb. 3, 1966, now abandoned, for Firearm Bolt Mechanism and Mechanism Used Therein for Converting Rotary Motion to Reciprocating and Rotary Motion.

Summary and aims of the invention

This invention relates to firearms and motion converting mechanisms, and deals more particularly with a mechanism for operating a reciprocating bolt in a firearm and to a mechanism, useful as part of a bolt operating mechanism, for converting rotary motion to reciprocating and rotary motion.

The general object of this invention is to provide an improved operating mechanism for a reciprocating bolt, which mechanism may be utilized in various different types of firearms and which is rugged, reliable, of simple construction, comprised of few parts, not liable to malfunction, and easy to manufacture. In keeping with this object, a further object is to provide a firearm bolt operating mechanism wherein certain parts perform several distinct functions, previously performed by separate parts, so as to reduce the total number of component parts.

Another object of this invention is to provide a firearm bolt operating mechanism which may be used with a reciprocating bolt having either a long or a short stroke and which may also be used either with a bolt having only a linear movement or with a bolt having both a linear and a rotative movement, the rotative movement being used, for example, to lock or unlock the bolt relative to the frame or housing when in its closed or firing position.

Another object of this invention is to provide a bolt operating mechanism for a firearm which mechanism is capable of operating the bolt in a very rapid manner and which requires a relatively small movement of the part to which the operating power is applied.

A further object of this invention is to provide a bolt operating mechanism of the foregoing character which is combined with an exposed hammer and an inertia firing pin to provide a safe firearm wherein a live cartridge may be safely carried in the firing chamber with the hammer down.

A more particular object of this invention is to provide a firearm of the foregoing character wherein the bolt is operated by a manually actuated lever which also carries the trigger for the firing mechanism and wherein the trigger is safely de-activated when the lever is out of its fully closed position so as to prohibit firing of the firearm except when the lever and bolt are in proper firing positions.

A still further object of this invention is to provide a bolt operating mechanism for a firearm useable with an exposed hammer having a low silhouette spur so as to allow the low mounting of a telescopic sight to the firearm and to also provide easy cocking of the hammer.

Another object of this invention is to provide a firearm construction from which a large number of different models or types of firearms may be made by making minor variations or changes in a few parts from model to model, most other parts remaining the same in the several models.

A still further object of this invention is to provide a lever action bolt operating mechanism including a safety means for preventing firing until the lever is in its fully closed position and also for preventing firing by the lever being closed while the trigger is in its firing position.

Another object of this invention is to provide a mechanism, particularly useful in a bolt operating mechanism, for converting rotary motion to reciprocating and rotary motion. In the case of a firearm the rotary part may be a gear or other driving element and the reciprocating and rotary part may be a bolt which is reciprocated between open and closed axial positions and rotated between locked and unlocked angular position. In the description which follows, several embodiments of such a mechanism are described as incorporated in firearms. It should be understood, however, that the mechanism is not necessarily limited to firearms and may be used to advantage in many other devices.

Other objects and advantages of the invention will be apparent from the following description and from the drawings forming a part hereof.

The drawings show a number of embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Brief description of the drawings

FIG. 1 is a fragmentary vertical sectional view taken on a plane passing generally longitudinally through a lever action firearm embodying the present invention, this view showing the bolt in its fully closed position and part of the bolt being shown broken away to reveal the firing pin.

FIG. 2 is a view generally similar to FIG. 1 but showing the parts in the positions occupied when the bolt is in its fully opened position.

FIG. 3 is a view generally similar to FIG. 1 but shows the parts in the positions occupied when the bolt is at the position at which it starts to rotate when moving from its fully opened to its fully closed position.

FIG. 4 is a transverse vertical sectional view taken on the line 4—4 of FIG. 1.

FIG. 5 is an enlarged view of the bolt of the FIG. 1 firearm, this view being taken looking toward the top of the bolt when oriented as in FIG. 2.

FIG. 6 is a side view of the bolt as shown in FIG. 5.

FIG. 7 is a bottom view of the FIG. 5 bolt.

FIG. 8 is a side view of the FIG. 5 bolt and shows the side opposite the one shown in FIG. 6.

FIG. 9 is a forward end view of the FIG. 5 bolt.

FIG. 10 is an enlarged end view of the bolt actuating gear of the FIG. 1 firearm.

FIG. 11 is a side elevational view of the gear of FIG. 10.

FIG. 12 is a development of the gear teeth on the larger diameter portion of the FIG. 10 gear.

FIG. 13 is a front elevational view of the housing of the firearm of FIG. 1, this view being taken generally on the line 13—13 of FIG. 1 with the barrel of the firearm being shown removed from the housing.

FIG. 14 is a fragmentary vertical sectional view taken on a plane passing generally longitudinally through a lever action firearm comprising another embodiment of this invention, this view showing the bolt of the firearm in its fully closed position.

FIG. 15 is generally similar to FIG. 14 but shows the parts of the FIG. 14 firearm in the positions occupied when the bolt is in its fully opened position.

FIG. 16 is an enlarged view of the bolt of the FIG. 14 firearm, this view being taken looking toward the top of the bolt when oriented as in FIG. 15.

FIG. 17 is a side view of the FIG. 16 bolt.

FIG. 18 is a bottom view of the FIG. 16 bolt.

FIG. 19 is a side view of the FIG. 16 bolt and shows the side opposite the one shown in FIG. 17.

FIG. 20 is an enlarged end view of the bolt actuating gear of the FIG. 14 firearm.

FIG. 21 is a side elevational view of the FIG. 20 gear.

FIG. 22 is a development of the gear teeth on the larger diameter portion of the FIG. 20 gear, this development being drawn on a scale somewhat smaller than FIG. 20.

FIG. 23 is a vertical sectional view taken generally on a plane passing longitudinally through a firearm comprising another embidiment of this invention.

FIG. 24 is a vertical sectional view taken on a plane passing generally longitudinally through a firearm comprising still another embodiment of this invention.

FIG. 25 is a vertical sectional view taken on a plane passing generally longitudinally through a firearm comprising still another embodiment of this invention.

FIG. 26 is a vertical sectional view taken on a plane passing generally longitudinally through a firearm comprising still another embodiment of this invention.

FIG. 27 is a transverse vertical sectional view taken on the line 27—27 of FIG. 26.

FIG. 31 is a vertical sectional view taken on a plane passing generally longitudinally through a firearm comprising still another embodiment of this invention.

FIG. 32 is a top view of the bolt operating lever of the FIG. 31 firearm.

FIG. 33 is a bottom view of the bolt of the FIG. 31 firearm.

FIG. 34 is a vertical sectional view taken on a plane passing generally longitudinally through a firearm comprising still another embodiment of this invention.

FIG. 35 is a vertical sectional view taken on a plane passing generally longitudinally through a firearm comprising still another embodiment of this invention.

FIG. 36 is a bottom view of the bolt of the FIG. 35 firearm.

FIG. 37 is a fragmentary top view of the bolt operating lever of the firearm of FIG. 35.

FIG. 38 is a fragment of a vertical sectional view generally similar to FIG. 35 but showing the parts in the positions occupied when the bolt is in a partially unlocked condition.

Description of the preferred embodiments

Figure 28:
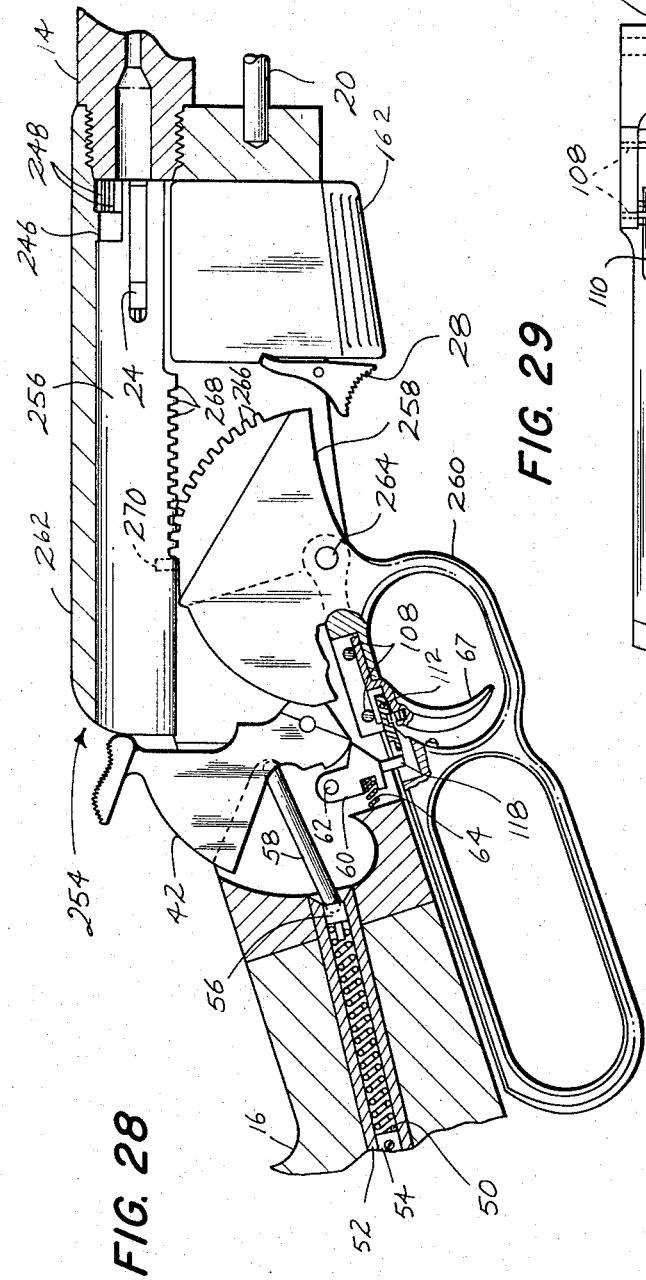
FIG. 28 is a vertical sectional view taken on a plane passing generally longitudinally through a firearm comprising still another embodiment of this invention.

Turning now to the drawings, wherein like reference numerals apply to like parts throughout the same, and first considering FIGS. 1 to 13, these figures show a lever action rifle, indicated generally at 10 in FIGS. 1, 2 and 3, embodying the present invention. Except for the bolt operating mechanism and related parts hereinafter described in detail, the firearm 10 is or may be of generally conventional construction and comprises basically a housing or frame 12, a barrel 14 threaded into the forward end of the housing, a stock 16 and a forearm 18 fastened to the housing 12 by means of a hanger rod 20. In the upper portion of the housing is an elongated bore or recess 21, concentric with the barrel 14, which receives a reciprocating bolt 22. FIG. 1 shows the bolt 22 in its fully closed position relative to the housing 12, and from this position the bolt may be moved rearwardly to a fully opened position as shown in FIG. 2. As shown in FIG. 1, the front end of the bolt 22 includes a relatively shallow cylindrical recess 23, which, in conjunction with the rear portion of the barrel bore, forms a firing chamber 25 for holding a cartridge during the firing of the firearm, the recess 23 receiving the rim portion of a cartridge positioned in the chamber 25. At the rear of the recess 23 is a face 40 which is engageable with the rear face of the cartridge in the chamber 25 during firing. Also included in the bolt 22 is a suitable extractor 24 which is engageable with the rim of the shell of a cartridge in the chamber of the barrel 14 to withdraw the same from the chamber after firing, and in the housing 12 is a suitable ejector 27 for expelling the shell of a spent cartridge from the bolt 22 and through an opening (not shown) in the side of the housing 12 facing the viewer in FIG. 1 after the shell is extracted from the firing chamber and as the bolt is moved further toward its fully opened position. The particular construction of the ejector and the extractor may, however, vary widely and by themselves the ejector and extractor form no part of this invention and are therefore not shown or described in detail. When referring to FIG. 6, however, it should be noted that the bolt 22 includes a slot 29 which receives and cooperates with a part of the ejector 27 during part of the movement of the bolt. Rearwardly of the barrel the housing includes a cartridge supply chamber located below and communicating with the bolt recess and from which cartridges are fed into the bolt recess. Various different means may be employed for feeding cartridges to the bolt recess, and in the illustrated firearm 10 this means is shown to comprise a clip 26 located in the cartridge supply recess of the housing. This clip may be of a generally conventional construction and is releasably held in place in the housing by a manually operable latch 28. The clip 26 stores a number of cartridges and acts to feed a fresh cartridge upwardly into the bolt recess 21 and into the path of the bolt 22 when the bolt is in its open position. During forward movement of the bolt, the fresh cartridge is engaged and moved by the bolt forwardly into the firing chamber 25. In FIG. 2 the broken lines at 30 indicate a fresh cartridge moved into the path of the bolt by the clip 26.

For firing a cartridge which is positioned in the firing chamber 25, the bolt 22 includes an inertia firing pin 32 slidably received in a bore passing completely through the bolt. At its forward end the firing pin 32 includes a small diameter portion, which serves as a striker and which includes a rounded head which, during firing, is engageable with the rear end of a cartridge positioned in the firing chamber 25 to cause the firing of the latter. Rearwardly of the smaller diameter position 31 is a larger diametered portion 33 of considerable mass which includes a relief groove 34 extending some distance longitudinally of the bolt and through which passes a transverse pin 36 fixed to the bolt 22 for holding the firing pin in place in the bolt and for limiting its movement relative thereto. Surrounding the rear part of the small diameter portion of the firing pin is a helical compression spring 38 which works between the firing pin and the bolt to urge the firing pin rearwardly relative to the bolt so as to normally urge the firing pin out of engagement with any cartridge which may be located in the firing chamber. The length of the firing pin 32 is such that when the rear end thereof is flush with the rear end of the bolt 22, as in FIG. 1, the forward end of the firing pin is positioned slightly behind the forward cartridge engaging face 40 of the bolt.

Associated with the bolt 22 and firing pin 32 is an exposed hammer 42 having a cocking spur 44 and a firing pin striking face 46. The hammer is pivotally mounted to the housing 12 by a transverse pivot pin 48 for movement between an uncocked position, as shown in FIG. 1, and a cocked position, as shown in FIG. 2. The spur 44 enables the hammer to be moved between its cocked and uncocked positions by the thumb or finger of a user but, as explained in more detail hereinafter, the arrangement of the hammer is such that it is also automatically moved from its uncocked to its cocked position as the bolt is moved from its closed to its opened position. Various different means may be used for biasing the hammer toward its uncocked position and, in the illustrated case, this means is shown to include a relatively heavy helical compression spring 50 supported in a guide tube 52 which is in turn located in the stock 16. The rear end of the spring 50 is fixed relative to the guide tube 52 by a stop 54. The stop 54 is located in the base of the guide tube 52 and is preferably movable to various different positions along the length of the tube to adjust the preload of the spring 50. At the forward end of the spring is a guide stem 56 having a reduced diameter shank fitted into the bore of the spring 50 and also having an enlarged head with a forwardly facing recess which receives the rear end of a strut 58. The forward end of the strut 58 is in turn received in a pocket in the rear face of the hammer 42. The force of the spring 50 is therefore transferred by the strut 58 to the hammer 42 to bias the hammer in the clockwise direction, as viewed in FIGS. 1, 2 and 3, toward its uncocked position.

When the hammer 42 is out of engagement with the bolt 22 the firing pin spring 38 holds the firing pin 32 at a position as shown in FIG. 2, whereat the rear end of the firing pin projects slightly beyond the rear end of the bolt. Therefore, when the hammer moves from its cocked to its uncocked position during firing, the striking face 46 of the hammer first engages the firing pin 32. This imparts momentum to the firing pin so that after the travel of the hammer is arrested by engagement of the hammer with the rear face of the bolt the firing pin nevertheless, and as a result of its momentum or inertia, travels forwardly beyond the position shown in FIG. 1 and strikes the cartridge in the firing chamber with sufficient violence to cause firing. However, when a live cartridge is in the firing chamber the hammer, if desired, may be moved slowly by hand to the uncocked position of FIG. 1 without any danger of the cartridge thereafter being fired by an accidental blow applied to the hammer since when the hammer engages the bolt the striking portion of the firing pin is out of engagement with the cartridge.

For controlling the operation of the hammer 42, the firearm 10 includes a sear 60. The sear 60 is located generally behind the hammer 42 and is supported for pivotal movement relative to the frame by a transverse pivot pin 62. The sear 60 extends generally downwardly from the pivot pin 62 and a compression spring 64 working between the sear and the housing urges the sear in the counterclockwise direction, as viewed in FIGS. 1, 2 and 3, toward engagement with the hammer. Included on the hammer 42 is a cocking notch 66 which is engageable by the sear 60, as shown in FIG. 2, to releasably hold the hammer 42 in its cocked position. Movement of the sear clockwise in FIG. 2, against the bias of the spring 64, releases the sear from the cocking notch 66 to allow the main spring 50 to drive the hammer to its uncocked or firing position. Movement of the sear to effect release of the hammer is controlled by a trigger 67 as described in more detail hereinafter.

In accordance with the invention, the firearm 10 further includes a simple means for driving the bolt 22 between its opened and closed positions relative to the housing 12. Before turning to a description of this means, however, it should be noted that the bolt 22, in addition to being merely reciprocated longitudinally relative to the housing 12, is also rotated relative to the housing when in or near its forwardmost position in order to effect locking or unlocking of the bolt relative to the housing, the bolt being locked relative to the housing when in its fully closed condition to prevent it from being blown open by the forces developed during the firing of a cartridge. The particular locking means employed may take various different forms and basically comprise means defining one or more rearwardly facing abutment surfaces on the housing and means defining one or more forwardly facing abutment surfaces on the bolt, the forwardly facing surfaces being moved into and out of overlapped angular alignment with the rearwardly facing surfaces by the rotation of the bolt. In the case of the firearm 10, the locking means is shown to comprise two sets of generally helical locking lugs 70, 70 and 72, 72 on the housing extending radially into the forward end portion of the housing bore 21. The lugs 70, 70 comprising one set are longitudinally spaced from one another, are located within a common angular zone, and are generally helical in shape. The locking lugs 72, 72 comprising the second set are similarly longitudinally spaced from one another, are located in a common angular zone, and are generally helical in shape. As shown best in FIG. 13, the two sets of housing lugs are angularly spaced from one another to provide two spaces 71 and 73 of substantial angular extent therebetween.

For cooperation with the locking lugs 70, 70 and 72, 72 of the housing, the bolt 22 includes two mating sets of lugs 74, 74 and 76, 76. At one end of the lugs 74, 74 is a longitudinally extending recess or space 75 and at the similar end of the lugs 76, 76 is another longitudinally extending recess or space 77. As will be evident from FIGS. 5 to 9 and 13, the arrangement of the locking lugs 70, 70 and 72, 72 on the housing and the arrangement of the locking lugs 74, 74 and 76, 76 on the bolt is such that as the bolt is moved from its fully opened position toward its closed position, the lugs on the bolt move past the lugs on the housing until all of the lugs on the bolt are aligned with spaces between the lugs on the housing. That is, the housing lugs 70, 70 move along the bolt recess 75, the housing lugs 72, 72 move along the bolt recess 77, the bolt lugs 74, 74 move along the housing space 71, and the bolt lugs 76, 76 move along the housing space 73. The position of the bolt at which all the housing lugs are aligned with spaces between the bolt lugs is shown in FIG. 3. As the bolt is thereafter rotated from the position shown in FIG. 3, the lugs on the bolt move between the lugs on the housing to hold the bolt against rearward movement during firing. FIG. 1 shows the fully locked or closed position of the bolt. To return the bolt from the fully closed position of FIG. 1 to the fully opened position of FIG. 2, the bolt is first rotated to remove the lugs of the bolt from angular alignment with the lugs of the housing, that is to the position of FIG. 3, and the bolt is then moved rearwardly to the FIG. 2 position. In rotating the bolt from the fully closed position to the FIG. 3 position, the rotative movement is stopped by the engagement of the end faces of the housing lugs 70, 70 with the longitudinal extending side face 83 of the bolt recess 75, one of such lug end faces being shown at 85 in FIG. 13.

Turning now to the bolt operating mechanism of the firearm 10, this mechanism includes a generally cylindrical driving element 78 supported for rotation relative to the housing 12 by a transverse pivot pin 80. The element 78 includes a number of teeth or similar driving elements on its periphery and for convenience is hereinafter referred to as a gear. The teeth on the gear 78 mesh with teeth or similar driving elements on the bolt 22 so that as the gear is rotated relative to the housing the bolt and the gear operate, at least part of the time, as a rack and pinion to cause the bolt to be reciprocated relative to the housing. The rotation of the gear 78 is in turn effected by a smaller diameter pinion 82 which is or may be integral with and located to one side of the gear 78. The teeth of the pinion 82 in turn mesh with a number of teeth formed on an internal gear segment 84 carried by an upwardly extending portion of a lever 86 pivotally connected to the housing 12 by a transverse pivot pin 88.

All of the teeth of the bolt 22 and of the gear 78 are not, however, exactly similar to the teeth of a simple rack and pinion. Referring with more particularity to FIGS. 6, 7, 8, 10, 11 and 12, which show in detail the shape and arrangement of the teeth, it will be noted that the teeth on the bolt 22 includes a first set of teeth 90, 90 each of which is in the nature of a straight spur gear tooth and is arranged generally perpendicular to a plane passing through the axis of the bolt. The teeth 90, 90 are formed by, and separated from one another, by grooves 91, 91 having straight root or bottom surfaces 93, 93. Also, the bolt, at the angular location of the teeth, is ground or otherwise machined or formed to include a flat 95 which extends over the length of the bolt occupied by the teeth and provides the teeth 90, 90 with straight top surfaces 97, 97. The set of teeth 90, 90 extends over a major portion of the length of the bolt from a point slightly behind the locking lugs 74, 74 and 76, 76 to a point near the rear end of the bolt. At the rear end of the set of teeth 90, 90, however, are two additional teeth 92, 92 which are inclined relative to the axis of the bolt so as to be generally helical in shape and formed by three similarly inclined or helical grooves 94, 94. These teeth and grooves pass over part of the flat 95 and extend angularly for some distance beyond the flat along one adjacent side of the bolt. The teeth 90, 90 and 92, 92 together form one composite set of teeth on the bolt. The gear 78, as best shown in FIGS. 10, 11 and 12, similarly includes a first set of teeth 96, 96 each of which is in the nature of a straight spur gear tooth and is arranged parallel to the axis of the gear, and which first set of teeth in use mesh with the teeth 90, 90 of the bolt 22. Similar to the bolt teeth 90, 90, the gear teeth 96, 96 include straight top surfaces 99, 99 and are separated by grooves having straight root surfaces 101, 101. Also on the gear 78 and at one end of the set of teeth 96, 96 are three additional teeth 98, 98 which are inclined relative to the axis of the gear 78 so as to be generally helical in shape and which in use mesh with the helical teeth 92, 92 and grooves 94, 94 of the bolt. The teeth 96, 96 and 98, 98 together form one composite set of teeth extending along an angularly portion of the periphery of the gear 78, and at one end of this composite set of teeth is a stopping flat 100 and at the other end is a stopping flat 102.

The action of the gear teeth and bolt teeth in moving the bolt between its open and closed position may be best understood by reference to FIGS. 1, 2 and 3. Starting with the bolt 22 in its fully open position as in FIG. 2, it will be noted that when the bolt is in this position the stopping flat 102 on the gear 78 is engageable with the outer surface of the bolt 22 adjacent the lugs 76, 76 to prevent further counterclockwise rotation of the gear and to thereby prevent further opening movement of the bolt. The stopping flat 102 therefore acts as a means for limiting the rearward or opening movement of the bolt relative to the housing and for also limiting the accompanying opening movement of the lever 86. In this FIG. 2 position of the gear the first gear tooth 96 adjacent the stopping flat 102 also intermeshes with the forwardmost teeth 90, 90 on the bolt. If the gear 78 is now rotated in a clockwise direction, as by moving the lever 86 clockwise toward its closed position, the other teeth 96, 96 on the gear 78 mesh with the other teeth 90, 90 on the bolt and drive the bolt forwardly toward the firing chamber 25. The number of teeth 96, 96 on the gear 78 is equal to the number teeth 90, 90 on the bolt 22 so that after the gear 78 is rotated to the point shown in FIG. 3 the last tooth 96 on the gear 78 is in engagement with the last tooth 90 on the bolt. Also, the first helical tooth 98 on the gear 78 is aligned with and at least partially received in the first helical groove 94 on the bolt. It should be noted that at this time the locking lugs on the bolt are aligned with the spaces between the locking lugs on the housing 12 and continued forward travel of the bolt relative to the housing is prevented by the engagement of the rearwardmost housing lug 70 with the surface 79 (see FIG. 5) at the end of the recess 75 and/or by engagement of the rearwardmost housing lug 72 with the surface 81 (see FIG. 6) at the end of the recess 77. Also, during the movement of the bolt between the FIG. 1 and FIG. 3 positions rotation of the bolt relative to the housing is prevented despite the cylindrical shape of the bolt and the housing bore 21. The means for preventing the rotation is provided by the straight top surfaces 97, 97 and 99, 99 and by the straight root surfaces 93, 93 and 101, 101 of the bolt and gear teeth, these surfaces being engageable with one another to prevent rotation of the bolt relative to the gear.

As the gear 78 is moved further in the clockwise direction from the position shown in FIG. 3, the helical teeth 98, 98 on the gear 78 move into more of a meshing relationship with the grooves 94, 94 and teeth 92, 92 of the bolt and a resulting camming and sliding action takes place which causes the bolt 22 to simultaneously rotate and move slightly forwardly in such a manner as to cause the locking lugs of the bolt to move between the locking lugs of the housing until the bolt is moved to the fully closed position of FIG. 1. The grooves defining the helical teeth on the bolt and gear do not have straight bottoms, but instead extend in helical curves about the bolt and gear axes, respectively, to allow the bolt to rotate, and the coaction between the two sets of helical teeth is generally similar that existing between the teeth of a pair of conventional helical gears used to drivingly connect two perpendicular non-intersecting shafts. Therefore, by a single continuous movement of the gear 78, as obtained by a single continuous pivotal movement of the lever 86, the bolt is reciprocated from its open to its closed position and rotated at its closed position to lock it relative to the housing. On the opening movement of the bolt the reverse process takes place with the helical teeth 92, 92 of the bolt and the helical teeth 98, 98 of the gear cooperating first to rotate the bolt to an unlocked position and with the other teeth of the bolt and gear thereafter operating to move the bolt to its rearward or open position. As shown in FIG. 1, the stopping flat 100 of the gear 78 is engageable with the outer surface of the bolt 22 to prevent further clockwise rotation of the gear and to thereby limit the closing and locking movement of the bolt. Also, as a result of the movement of the gear 78 by the smaller diameter pinion 82 and the gear segment 84, a mechanical advantage is achieved between the lever 86 and the gear 78 so that a large movement of the gear 78 may be obtained with a much smaller movement of the lever 86. For example, in the illustrated embodiment the mechanical advantage is about 5 to 1 so that the full range of movement of the gear 78 may be obtained with about 60 degrees of movement of the lever 86. It should also be understood that the amount of rotation of the bolt employed in the firearm is somewhat dependent on the amount of locking required between the bolt and the housing and that more or less rotation of the bolt, to obtain more or less overlap of the locking lugs, may be used depending on the size of cartridge used in the firearm.

As another aspect of the invention, the lever 86 also preferably carries the trigger 67 which is slidably mounted to the lever 86 so as to be reciprocable relative thereto between a normal forward position and a rearward firing position. More particularly, the trigger 67 includes an upper portion 104 which is received in a cavity 106 in the upper middle portion of the lever and which is retained in the cavity 106 for slidable movement relative thereto by two transverse pins 108, 108 fixed to the lever and extending across the cavity 106. Carried by the upper portion 104 of the trigger is a part 110, referred to as a trigger safety bar, which is pivotally connected to the trigger by a transverse pivot pin 112. The trigger safety bar extends rearwardly beyond the pivot pin 112 and the rear portion thereof is urged to a raised position relative to the trigger by a helical compression spring 114. Referring particularly to FIG. 1, the trigger safety bar 100 at its outer or rear end includes an upwardly facing first surface 109 arranged generally radially of its pivot pin 112 and a second rearwardly facing surface 111 arranged generally parallel to the pivot pin 112 and normal to the surface 109. The trigger itself is urged toward its normal forward position relative to the lever 86 by a suitable spring, not shown, and the rearward travel of the trigger is limited by an adjustable stop 116 threadably received by the lever behind the trigger as best shown in FIG. 2. The stop 116 may therefore be adjusted toward or away from the trigger limit or control the amount of overtravel the trigger is capable of after the sear 60 is released.

As shown in FIG. 1, the rear portion of the trigger safety bar 110 is aligned with a depending portion 118 of the sear 60 when the lever 86 is in fully closed position. The sear portion 118 in turn includes a first forwardly facing surface 113 arranged generally radially of the sear pivot pin 62 and a second downwardly facing surface 115 arranged generally parallel to the pivot pin 62 and normal to the surface 113. As the trigger 67 is pulled rearwardly from the FIG. 1 position the safety bar surface 111 engages the sear surface 113 and moves the sear clockwise to release the hammer 42 for movement to its uncocked position to fire the cartridge in the cartridge chamber. The arrangement of the trigger safety bar 110 is such, however, that should the lever 86 be displaced slightly from its fully closed position at the time the trigger is pulled, the safety bar will pass beneath the depending sear portion 118 without actuating the sear, as shown by the broken line showing of FIG. 2. Also, should the trigger 67 be held in its rearward position as the lever 86 is closed, the trigger safety bar surface 109 will engage the sear surface 115 and as a result the trigger safety bar will be pivoted about its pivot pin 112 without producing any undue forces on either the sear or the lever and without moving the sear to its released position. When the trigger is thereafter released for movement to its forward position, the trigger safety bar 110 will, after moving past the depending sear portion 118, be returned to an active position by its spring 114, allowing the trigger bar surface 111 to engage the sear surface 113 when the trigger is thereafter again pulled rearwardly.

Before leaving the description of the firearm 10, it should also be noted that the arrangement of the bolt 22 and hammer 42 is such that as the bolt 22 is moved from its fully closed to its fully open position, the rear end of the bolt 22 will engage the striking face 46 of the hammer and move the hammer toward its cocked position. The flat 95 stops short of the rear end of the bolt so that on the rear end of the bolt, and in angular alignment with the teeth thereon, is a portion 120 which extends radially outwardly beyond the top surfaces of the bolt teeth. The location of the cocking notch 66 on the hammer 42 is such that the sear engages the cocking notch 66 to hold the hammer in its cocked position when the hammer moves over the bolt portion 120 and, after the portion 120 moves rearwardly beyond the hammer, the sear in engagement with the cocking notch 66 holds the hammer from further engagement with the bolt so that the teeth of the bolt are prevented from engaging the hammer as they move therepast.

In further regard to the firearm 10 it should also be noted that the helical shape of the locking lugs in the housing and on the bolt is a convenience in that it allows the lugs in the housing to be easily formed by the use of a tap. The helical shape of the lugs is not, however, essential to the operation of the bolt and driving gear and, if desired, the lugs could be made so as to be straight rather than helical in shape. In this case the bolt would undergo no longitudinal movement while being rotated by the helical bolt and gear teeth.

Turning now to FIGS. 14 to 22, these figures show an alternative form of firearm, indicated generally at 121 in FIGS. 14 and 15, embodying the present invention. The illustrated firearm 121 is identical to the firearm 10 of FIGS. 1 to 13, except for including a different arrangement of teeth on the bolt and on the rotary bolt operating gear. The bolt of the firearm 121 is indicated at 122 and the bolt operating gear at 124. Most other parts of the firearm 121 are identical or similar to the corresponding parts of the firearm 10 and have been given the same reference numerals and need not be redescribed.

Referring to the bolt 122 and gear 124 of the firearm 121, and first considering the bolt 122, this bolt as shown best in FIG. 18 includes a first set of straight teeth 126, 126 which set of teeth extends along a major portion of the length of the bolt from a position just to the rear of the locking lugs to a point near the rear end of the bolt. At the location of the teeth the bolt includes a longitudinally extending flat 125 which provides the teeth 126, 126 with straight and flat top surfaces 127, 127. The teeth 126, 126 are separated from one another by straight bottomed grooves 129, 129 and the grooves and the teeth are inclined relative to the axis of the bolt. At the rear end of the set of teeth 126, 126 is another set of two teeth 128, 128 formed by three inclined grooves 130, 130. The teeth 128, 128 and grooves 130, 130 are inclined relative the axis of the bolt 122 at the same angle as the teeth 126, 126 and grooves 129, 129 and extend in a helical fashion from the bottom of the bolt and for some distance along one side of the bolt. Together the set of teeth 126, 126 and the set of teeth 128, 128 therefore form a composite set of teeth extending a substantial distance along the length of the bolt. In addition to the teeth 126, 126 and 128, 128, the bolt 122 also includes, in its upper surface, a guide slot having a first longitudinally extending portion 134 substantially equal in length to the length of the set of teeth 126, 126 and also having at the rear end of the longitudinally extending portion 134 a generally helically extending portion 136.

The structure of the gear which cooperates with the bolt 122 is best shown in FIGS. 20, 21 and 22. Referring to these figures the gear 124 includes a set of helical teeth 133, 133 extending over the major portion of its periphery. All of the teeth 133, 133 are similar to one another, and at one point along its periphery the gear 124 includes a stopping flat 135. A driving pinion 82 is fixed to the gear 124 at one side thereof and is rotated by a gear segment 84, carried by the lever 86, in response to movement of the lever.

As shown in FIGS. 14 and 15, the teeth on the gear 124 mesh with the teeth on the bolt 122. Also the housing 12 of the firearm includes a guide pin 137 which projects downwardly into the housing bore 21 and into the slot 132 of the bolt. When the bolt is fully open as shown in FIG. 15, the gear teeth 133, 133 mesh with the teeth 126, 126 on the bolt 122 and the housing pin 137 is located in the forward end of the longitudinal portion 134 of the guide slot 132. As the lever 86 is rotated clockwise from the FIG. 15 position, the gear segment 84 on the lever rotates the pinion 82 of the gear 124 to rotate the gear 124 and to drive the bolt forwardly. Since the teeth on the gear 124 and the teeth on the bolt are both inclined, there is some force exerted on the bolt during this motion tending to rotate it relative to the housing. The engagement of the top surfaces of the gear teeth 133, 133 with the straight root surfaces of the bolt teeth 126, 126 could be used to resist this force and to prevent the bolt from rotating. Preferably, however, bolt rotation is prevented by the engagement of the pin 137 with one wall of the slot which causes the bolt to be guided in a straight linear motion. When the teeth on the gear 124 reach the teeth 128, 128 and helically curved grooves 130, 130 on the bolt the guide pin 137 is positioned at the rear end of the longitudinal portion 134 of the guide slot 132. At this time the locking lugs on the bolt are also aligned with the spaces between the locking lugs on the housing and the rearwardmost housing lugs are in engagement with the surfaces 79 and 81 at the rear ends of the bolt recesses 75 and 77 to prevent further purely linear forward motion of the bolt. Thereafter, continued rotation of the gear 124, as a result of a camming action between the gear teeth 133, 133 and the bolt teeth 128, 128, causes the bolt to be rotated with the guide pin 137 moving in the radial portion 136 of the bolt guide slot 132. As this rotation of the bolt takes place, the locking lugs of the bolt move between the locking lugs of the housing to the position shown in FIG. 14 to lock the bolt against rearward movement by the pressures developed during firing. When the bolt reaches the fully closed position of FIG. 14, the stopping flat 135 on the gear 124 engages the outer surface of the bolt to prevent further rotation of the gear and to thereby limit the rotative movement of the bolt.

When the bolt is moved to its fully open position, as shown in FIG. 15, the pinion 82 on the gear 124 engages the forward wall 138 of the gear segment 84, as shown, to limit the opening movement of the bolt and lever 86, the wall 138 having a curvature generally similar to that of the pinion 82 to prevent undue wear on any one point of the pinion. It will, of course, be understood that various other different stopping means, or combinations of stopping means, may be employed to limit the movement of the bolt and lever in both directions without departing from the invention. As an example of an alternative means, the guide pin 137 could be arranged to engage one or both ends of the guide slot 132 to limit the bolt movement in one or both directions. As another example of an alternative stopping means which could be used to limit the closing movement of the bolt, the bolt, as shown by the broken lines of FIG. 17, could also include an inset block 139 providing radial abutment surfaces 140, 140 at the trailing ends of at least some of the bolt lugs 74, 74 which abutment surfaces 140, 140 are engageable by the leading end surfaces 142, 142 (see FIG. 13) of the corresponding housing lugs 70, 70 as the bolt is moved to its fully closed position.

As mentioned previously, the bolt operating mechanism of this invention is not necessarily limited to use with firearms in which the bolt is rotated at the end of its closing moment to affect a locking between the bolt and the bolt-receiving housing. In particular, locking of the bolt may be omitted in some instances in firearms adapted for firing relatively low power cartridges, such as for example .22 caliber cartridges. In the drawings such a firearm is shown by way of example in FIG. 23 and is indicated generally by reference number 144. In this firearm the bolt is indicated at 146 and the bolt operating gear at 148. The bolt has a series of teeth 150, 150 which mesh with a corresponding set of teeth 152, 152 on the bolt operating gear 148. The bolt teeth 150, 150 and the gear teeth 152, 152 are all arranged so as to extend generally perpendicular to the axis of a bolt with the result that no force tending to rotate the bolt is applied thereto during the movement of the operating gear 148. If desired, however, the teeth could be inclined relative to the axis of the bolt and a separate means employed for restraining the bolt against rotation.

The housing which receives the bolt 146 is indicated by the reference numeral 154. The bolt operating gear 148 is rotatably mounted to this housing by a transverse pivot pin 156 and includes a pinion 158 which is driven by the teeth of an internal gear segment 160 carried by the lever 86. Since the firearm 144 is intended for use in firing .22 caliber cartridges, or other cartridges having relatively short lengths, the bolt 146 need be moved only a relatively short distance relative to the housing 154, and therefore the bolt 146, the set of bolt teeth 150, 150 the internal gear segment 160 and the clip 162 may, as illustrated, be made of relatively shorter lengths than the corresponding parts of the previously described firearms. The forward or closing movement of the bolt 146 is limited by engagement of the forward end face 161 of the bolt with the rear end face 163 of the barrel. Forwardly of the forwardmost groove defining the teeth 150, 150 the bolt 146 includes a surface 165 which is considerably larger, in the direction axially of the bolt, than any of the teeth 150, 150. Rearward or opening movement of the bolt 146 is limited by engagement of one of the teeth 152, 152 of the bolt operating gear with the surface 165. In other respects, however, the firearm 144 is or may be generally similar to the firearm 10 of FIG. 1 and parts of the firearm 144 which are similar to those of the firearm 10 have been given the same reference numbers as in FIGS. 1 to 13 and need not be redescribed.

In all of the previously described firearms the operation of the bolt operating gear has been by means of an internal gear segment carried by a manually operable lever and meshing with a pinion on the gear. The invention is not, however, necessarily limited to this particular method of rotating the bolt operating gear and various other means for achieving the rotation may be employed. One such means is shown, by way of example, in FIG. 24 which shows a pump-action firearm 164 wherein the bolt operating gear 148 is driven by a rod 166 having a set of teeth 168 on its rear end which mesh with the teeth on the pinion 158. The rod 166 is arranged generally parallel with the barrel 14 of the firearm and extends forwardly through the front wall of the housing 154 with which it has a loose sliding fit. The rear end of the rod 166 includes a longitudinally elongated slot 170 which receives a guide pin 172, fixed to the wall (not shown) of the housing facing the viewer in FIG. 24, for holding the rear end of the rod in engagement with the pinion 158 and for limiting its movement to longitudinal reciprocation. The forward end of the rod 166 is connected to a forearm 174 which is slidably supported for longitudinal reciprocation relative to the barrel by a hanger rod 176. Therefore, it will be obvious from FIG. 24 that pumping or reciprocation of the forearm 174 relative to the barrel will cause the bolt 146 to be reciprocated between its open and closed positions relative to the housing 154.

The firearm 164 of FIG. 24 also includes a trigger guard 178 which is fixed to the frame 154 by a tongue and groove connection 180 at its rear end and by a transverse pin 182 at its forward end. The trigger guard 178 carries an adjustable trigger stop 184 similar to the stop 116 of the firearm 10 of FIGS. 1 and 2. Also, the trigger 186 is integral with the sear and is pivotally connected to the housing 154 by a transverse pivot pin 188. That is, the upper portion 190 of the trigger 186 comprises a sear which is engageable with the hammer 42 to hold it in its cocked position. A helical compression spring 192 urges the trigger 186 and its upper or sear portion 190 forwardly toward engagement with the hammer. Other parts of the firearm 164 are identical or similar to corresponding parts of the firearm 144 of FIG. 23 and have been given the same reference numbers and need not be redescribed.

FIG. 25 illustrates a gas operated semi-automatic firearm 194 embodying the present invention. By way of example, the bolt and bolt operating gear of the firearm 194 are shown to be similar to the corresponding parts of the firearm 10 of FIG. 1 and have been given the same reference numerals as in the firearm 10. The bolt operating gear, however, instead of being operated by a gear segment carried by a manually operated lever is operated by a reciprocating rod 196 having a set of teeth 198, 198 on its rear end which mesh with the teeth on the pinion 82 of the gear 78. A longitudinally elongated slot 200 in the rear end of the rod 196 receives a guide pin 202 which holds the rod 196 in engagement with the pinion 82 and which limits its movement to reciprocation longitudinally of the barrel and bolt of the firearm. At its forward end the rod 196 extends slidably through the forward wall of the housing 12, through a depending portion 204 of the barrel, and into the rearward portion of a part 206 threadably received in another depending portion 208 of the barrel. Between the forward wall of the housing 12 and the barrel portion 204, the rod 196 receives a helical compression spring 210 which is compressed between the forward wall of the housing 12 and a radial flange 212 on the rod 196, the flange 212 being engageable with the barrel portion 204 to limit the forward movement of the rod. The depending barrel portion 208 of the firearm 194 includes a pressure chamber 214 which communicates with the barrel bore through a passageway 216. The part 206 in turn includes a cylindrical bore which slidably receives a small piston 217 having a forward face exposed to the pressure in the chamber 214. To allow for initial manual cocking of the bolt 22 the bolt includes a cocking or charging handle 221 which passes laterally outwardly through a suitable slot (not shown) in the housing 12 and which may be grasped and manipulated by a user to move the bolt between its closed and opened positions to charge the first cartridge of a fresh clip into the firing chamber of the barrel 14. If desired, the charging handle 221 may be attached to the actuating rod 196 rather than the bolt.

Considering the operation of the firearm 194, when a cartridge is fired the pressurized gases produced by the cartridge enter the pressure chamber 214 through the passageway 216 and cause the piston 218 to be moved violently rearwardly so as to engage and apply an impulse to the forward end of the actuating rod 196. The actual stroke of the piston 217 is relatively short and limited by the length of the bore in the part 206, but the force with which the piston strikes or engages the rod 196 is sufficient to cause it to impart enough momentum to the rod to cause it to move rearwardly against the bias of the spring 210 and to rotate the bolt operating gear 78 a distance sufficient to fully open the bolt. After the rearward movement of the rod 196 is arrested the spring 210 thereafter returns the rod to its forward position, with the rod rotating the gear 78 in the clockwise direction and returning the bolt 22 to its fully closed position. The action of the gas pressure therefore produces a semi-automatic operation of the firearm. That is, after the trigger is pulled to fire a cartridge, the gases produced by the cartridge cause the bolt to be operated to expel the fired cartridge to insert a new cartridge in the firing chamber, and to cock the hammer, thereby putting the firearm into a condition for firing by the next pull of the trigger.

FIGS. 26 and 27 show a firearm 218 embodying the present invention and which is, except for the bolt and the bolt operating mechanism, generally similar to the firearm 164 of FIG. 24. Referring to FIGS. 26 and 27, the firearm 218 includes a bolt 220 which is received in a longitudinal bore in the housing 222 and which is slidable in both a reciprocating and a rotative manner relative thereto. Associated with the bolt 220 is a bolt operating gear or element 224 supported for rotation relative to the housing 218 by a pin 226 which also acts to fix the forward end of the trigger guard 178 to the housing. The gear 224 differs from the previously described bolt operating gear insofar as it comprises only a segment of a full gear, having teeth extending along an arcuate portion of its periphery approximately 90° in angular extent. The gear 224 includes a first set of teeth 228, 228 which are arranged generally perpendicular to the axis of the bolt 220 and which correspond in general to the teeth 96, 96 of the gear 78 of the firearm 10 of FIG. 1. In addition, the gear 224 includes two inclined teeth 230, 230 corresponding generally to the inclined teeth 98, 98 of the gear 78 of the firearm 10 of FIG. 1. For cooperation with the teeth 228, 228 and 230, 230 of the gear 224, the bolt 220 includes a longitudinally extending set of inclined teeth generally similar to the teeth provided on the bolt 22 of the firearm 10 of FIG. 1. Therefore, as the gear 224 is rotated relative to the housing 222 the bolt 220 is both reciprocated and rotated relative to the housing in substantially the same manner as is the bolt 22 of the firearm 10. It should be noted, however, that the gear 224 of the firearm 218, instead of being rotated by an associated pinion is rotated directly by a reciprocating rod 232 which extends slidably through the forward wall of the housing 222 and is connected with a reciprocable forearm 234 supported from the housing 222 by a hanger rod 236. At its rear end, the rod 232 includes an elongated slot 238 which receives a guide pin 240 fixed to the wall of the housing 222 facing the viewer in FIG. 26. Rearwardly beyond the slot 238 the rod 232 has fixed thereto another pin 242 which extends into a slot 244 in the gear 224. Therefore, as the forearm 234 is moved rearwardly in FIG. 26, the rod 232 is also moved rearwardly and the pin 242 carried thereby through engagement with the slot 244 rotates the gear segment 224 in the counterclockwise direction to first rotate the bolt 220 to effect unlocking and to then reciprocate the bolt rearwardly to its open position. Thereafter, forward movement of the forearm 234 effects a reverse movement of the parts to move the bolt 220 and to lock it in its closed position as shown in FIG. 26.

The bolt 220 of the firearm 218 also includes a slightly different form of locking means than that employed in the firearm 10 of FIG. 1. Referring to FIGS. 26 and 27, this locking means includes a number of angularly spaced lugs on the housing 222, all of which lugs are located in a common longitudinal zone. In FIG. 26 one such lug is shown in section at 246. Cooperating with the housing lugs 246, 246 are a number of lugs 248, 248 formed on the bolt 220 and separated by longitudinally extending grooves 250, 250. Behind the lugs 248, 248 the bolt 220 includes an angularly extending recess 252 which accommodates the housing lugs 246, 246 when the bolt is in its fully closed position. The housing lugs 246, 246 and the bolt lugs 248, 248 are so arranged that as the bolt moves forwardly from its open position to its closed position, the housing lugs 246, 246 pass through the bolt grooves 250, 250 until they become aligned with the angularly extending recess 252. The bolt is then rotated several degrees to bring the bolt lugs 248, 248 into angular alignment with the housing lugs 246, 246, so that the forward faces of the lugs 246, 246 engage the rearward faces of the lugs 248, 248. FIG. 27 shows the bolt in its locked position, and in this figure the housing lugs 246, 246 are aligned with and behind the bolt lugs 248, 248. It will, therefore, be understood that the arrangement of the teeth on the gear 224, and on the bolt 220, is such that after the bolt 220 is reciprocated from its fully open to its fully closed position continued clockwise movement of the gear 224 causes the bolt to be rotated, without undergoing any further linear movement, to effect the desired interlocking of the housing and bolt lugs.

Figure 29:
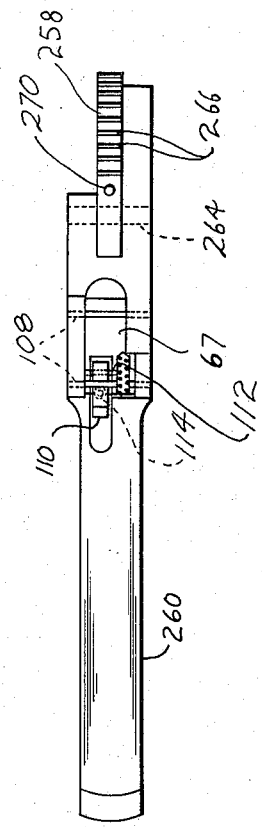
FIG. 29 is a top view of the bolt operating lever of the FIG. 28 firearm.
Figure 30:
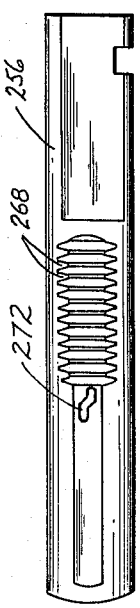
FIG. 30 is a bottom view of the bolt of the FIG. 28 firearm.

FIGS. 28, 29 and 30 show a still further embodiment of the invention in the form of a firearm 254 which is in many respects similar to the firearm 218 of FIGS. 26 and 27 except for being a lever action firearm rather than a pump action firearm. Referring more closely to FIGS. 28, 29 and 30 the firearm 254 includes a bolt 256 which is operated by a gear segment 258 integral with a manually operable lever 260 connected to the housing 262 of the firearm by a transverse pivot pin 164. Except for having the gear segment 258 connected therewith in place of an internal gear segment such as shown at 84 in FIG. 1, the lever 260 is generally similar to the lever 86 of the firearm 10 of FIG. 1 and the trigger and other parts of the firing mechanism similar to corresponding parts of the firearm 10 have been given the same reference numerals as in FIG. 1. The bolt 256 of the firearm 254 is generally similar to the bolt 220 of the firearm 218 and includes a set of locking lugs 248, 248 which cooperate with a corresponding set of locking lugs 246, 246 on the housing 262 to lock the bolt in its forward position, the bolt being rotated without any further forward movement to effect an interlocking of the lugs after it is reciprocated from its fully open to its fully closed position.

For reciprocating and rotating the bolt 256 relative to the housing 262, the gear segment 258 carried by the lever 260 includes a set of teeth 266, 266 which are arranged perpendicular to the axis of the bolt 256 and which cooperate with a corresponding set of teeth 268, 268 formed on the bolt. The gear teeth 266, 266 and the bolt teeth 268, 268 are, however, used only to achieve reciprocation of the bolt between its open and closed positions relative to the housing. To obtain a rotation of the bolt after it reaches its closed position, the gear 258 includes a radially extending pin 270 located slightly beyond its last tooth 266. Cooperating with the pin 270, the bolt 256 includes a slot 272 located slightly beyond its last tooth 268. The shape and location of the slot 272 relative to the pin 270 is such that as the last tooth 266 of the gear segment 258 leaves the last tooth 268 of the bolt the pin 270 enters the slot 272. Continued movement of the gear 258 in the clockwise direction, as viewed in FIG. 28, thereafter moves the pin 270 forward in the slot 272 and the shape of the slot 272 is such that the bolt is rotated the proper amount as a result of a camming action between the pin and the slot.

FIGS. 31, 32 and 33 show still another embodiment of the invention in the form of a firearm 274. The firearm 274 is generally similar to the firearm 254 of FIGS. 28, 29 and 31, except for using a slightly different means for rotating the bolt during the locking of the bolt relative to the housing. The means used is similar to that used in the firearm 218 of FIGS. 26 and 27, and except that the driving gear for the bolt is connected to and actuated by a lever rather than by a sliding forearm, the firearm 274 is also generally similar to the firearm 218. Referring more particularly to FIGS. 31, 32 and 33, the firearm 274 includes a bolt 276 which is generally cylindrical in shape and is reciprocated relative to the housing 278, for movement between an open and a closed position. In its closed position the bolt is rotated relative to the housing to lock it against movement to its open position. The locking means employed is similar to that disclosed in connection with the firearm of FIGS. 26 and 27 and includes locking lugs 248, 248 on the bolt and cooperating locking lugs, such as the one shown 246, located in the housing bore.

The means for actuating the bolt 276 comprises a gear segment 280 fixed to the lever 260. On its periphery the gear segment 280 includes a first set of straight spur teeth 282, 282 which are arranged perpendicular to a plane passing through the axis of the bolt 276, and the bolt 276 includes a cooperating set of straight spur teeth 284, 284 also arranged perpendicular to the plane passing through its axis, the gear teeth 282, 282 and the bolt teeth 284, 284 operating as a rack and pinion to reciprocate the bolt 276 in response to rotation of the gear by the lever 260. Adjacent the last or rearwardmost spur tooth 282 the gear 280 also includes two helical teeth 286, 286 which cooperate with corresponding helical teeth 288, 288 on the bolt to rotate the bolt between its locked and unlocked conditions. The helical gear teeth 286, 286 and the helical bolt teeth 288, 288 therefor perform the same function as the gear pin 270 and the bolt slot 272 of the firearm 254 of FIGS. 28, 29 and 30.

FIG. 34 shows another embodiment of the invention in the form of a firearm 290. The firearm 290 is of the type which is commonly referred to as a blow back semi-automatic and utilizes the pressure exerted on the bolt by the cartridge during firing to actuate the bolt and to bring a fresh cartridge into the firing chamber. In the firearm 290 the bolt 292 is supported for reciprocating movement only relative to the housing 294 and undergoes no rotative movement. In FIG. 34 the bolt 292 is shown in its closed or firing position and from this position it is movable rearwardly to an open position for ejecting the spent cartridge and for charging a fresh cartridge into the firing chamber 296. A manually operable charging handle 298 is fixed to the bolt and extends through the adjacent housing wall (not shown) to enable the bolt to be moved to its open position by hand for charging the first cartridge of the clip 162 into the firing chamber.

For moving the bolt 292 to provide semi-automatic operation the bolt includes on its bottom surface a set of straight spur teeth 300, 300 which mesh with a cooperating set of spur teeth 302, 302 on an associated operating gear 304 located below the bolt and supported for rotation relative to the housing 294 by a pivot pin 306 fixed to the housing. The bolt teeth 300, 300 and the gear 302, 302 therefor cooperate as a rack and pinion to cause reciprocating movement of the bolt in response to rotation of the gear. Also included on the gear 304 is a pinion 308 having teeth which mesh with a set of teeth 310, 310 provided on the rear end portion of an actuating rod 312. The actuating rod 312 extends forwardly from the gear 304 and is slidably supported by the forward end wall 295 of the housing 294 through which it extends. Adjacent the teeth 310, 310 the rod 312 also includes an axially elongated slot 314 which receives a guide pin 316. The guide pin 316 is fixed to the adjacent side wall (not shown) of the housing 294 and serves to slidably support the rear end of the actuating rod and to hold the rod teeth 310, 310 in engagement with the teeth of the pinion 308. Forwardly of the housing end wall 295, the rod 312 is also slidably supported by a depending lug 316 fixed to the barrel 14. Rearwardly of the lug 316 the rod 312 has fixed thereto a collar 318 which provides a rearwardly facing abutment surface or seat for a helical compression spring 320, the spring 320 being compressed between the collar 318 and the end wall 295 and surrounding the rod 312.

In the operation of the firearm 290, a cartridge is first charged into the firing chamber 296 by operating the charging handle 298 to manually open and close the bolt. After the charging handle 298 is released, the spring 320, acting through the actuating rod 312 and gear 304, exerts a biasing force on the bolt 292 holding it in its closed or firing position, shown in FIG. 34. When the cartridge in the firing chamber is thereafter fired it exerts a rearward force on the bolt 292 and drives the bolt 292 rearwardly against the force of the spring 320, the spring 320 being so designed with relation to the size of the cartridge that the force exerted by the cartridge is sufficient to drive the bolt to its fully open position. As the bolt moves to its open position, the gear 304 is rotated and the actuating rod 312 is moved rearwardly to compress the spring 320. After the bolt reaches its fully open position, as determined by a suitable stop means (not shown), the spring 320 then returns the bolt to its closed or firing position by moving the actuating rod forwardly and rotating the gear 340. It will of course be understood that during the opening and closing movement of the bolt, the fired cartridge is removed from the firing chamber, a fresh cartridge is inserted therein, and the hammer is cocked so that at the end of the cycle the firearm is ready for firing the new cartridge in the firing chamber by merely pulling the trigger.

FIGS. 35, 36, 37 and 38 show another embodiment of the invention in the form of a firearm 322 wherein the bolt is reciprocated relative to the housing, and is also locked in its firing position by the rotation of an associated actuating gear. In this case, however, the locking is accomplished without rotating the bolt relative to the housing. Referring to FIGS. 35 to 38, the housing of the firearm is shown at 324 and the bolt at 326, with FIG. 35 showing the bolt 326 in its closed and fully locked position relative to the housing. The bolt 326 is supported in the housing 324 for reciprocating movement between its closed and open positions and from the closed position of FIG. 35 is movable rearwardly to its open position. The locking means for preventing the bolt from moving to its open position during firing include a generally rearwardly facing abutment surface 328 on the upper surface of the bolt, and located a considerable distance from the forward end of the bolt, and a cooperating generally rearwardly facing abutment surface 330 located in the upper portion of the housing bore which receives the bolt. When the bolt is in its locked condition the two abutment surfaces 328 and 330 coengage to prevent rearward movement of the bolt. The rear end of the bolt 326 is however movable vertically relative to the housing 324 to bring the abutment surfaces 328 and 330 into and out of locking relationship, and from the position shown in FIG. 35 the rear end of the bolt is movable downwardly to move the surfaces out of locking relationship. FIG. 38 shows the bolt at a position between its fully locked and fully unlocked conditions, and from the position of FIG. 38 the rear end of the bolt is movable a slight distance further downwardly to move the bolt abutment surface 328 entirely out of vertical alignment with the housing surface 330, so that the bolt may thereafter be moved rearwardly without the bolt surface 328 striking the housing surface 330.

The movement of the bolt relative to the housing is effected by an actuating gear 332 which is rotatable relative to the housing and which may be operated in a various number of different ways, the gear 332 in the illustrated case being integral with a lever 260 pivotally connected with the housing 324 by a transverse pivot pin 262. For reciprocating the bolt 326 in response to operation of the lever 260 the gear 332 includes a first set of straight spur teeth 334, 334 which cooperate with a corresponding set of straight spur teeth 336, 336 formed on the bottom of the bolt. The gear teeth 334, 334 and the bolt teeth 336, 336 cooperate as the teeth of a rack and pinion to reciprocate the bolt upon rotation of the gear. For raising and lowering the rear end of the bolt, the gear and bolt further include cooperating cam surfaces which are brought into coengagement when the bolt is in its forwardmost position, and biasing means are provided between the housing and the bolt for urging the rear end of the bolt downwardly toward the gear and away from its locked position.

The cam means on the gear 332 includes a lug 338 located rearwardly beyond the last gear teeth 334. This lug has a first generally forwardly facing surface 340, which is inclined relative to a plane passing radially through the pivot pin 262, and also has a second surface 342, which is arcuate about the axis of the pivot pin 262. The cam means on the bolt 236, on the other hand, includes a lug 343 having a first generally rearwardly facing surface 344 inclined relative to the axis of the bolt and also having a second surface 346 extending parallel to the bolt axis. Between the bolt lug 343 and the last bolt tooth 336 is a recess 348 which accommodates another lug 350 located on the gear 332 between the last tooth 334 and the lug 338.

The biasing means for urging the rear end of the bolt downwardly may take various different forms and in the illustrated example comprises a cylindrical button 352 slidably received in a conforming radial blind bore in the bolt and urged upwardly through the open upper end of the bore by a helical compression spring 354, the button 352 being retained in place in the bolt by a transverse pin 356 carried by the bolt and received in an elongated slot formed in one side of the button. The upper end of the button 352 is rounded and bears against the adjacent surface of the housing bore and during reciprocating movement of the bolt slides along the bore surface.

The operation of the locking means of the firearm 322 may be best appreciated by referring to FIGS. 35 and 38. In the closed and locked position of the bolt, as shown in FIG. 35, the arcuate surface 342 on the gear 332 engages the surface 346 on the bolt and holds the rear end of the bolt in its raised or locked position. If the gear is now rotated in the counterclockwise direction of FIG. 35 the gear surface 342 is gradually moved out of alignment with the bolt surface 346 until eventually the inclined gear surface 340 is brought into engagement with the inclined bolt surface 344. After this point is reached continued counterclockwise rotation of the gear 332 causes the bolt surface 344 to slide down on the gear surface 340 under the action of the biasing button 352, as shown in FIG. 38. The camming surfaces and the bolt gear teeth are so related that as the bolt reaches its fully lowered position, whereat the abutment surfaces 328 and 330 are completely out of alignment with one another, the rearwardmost bolt tooth 326 is meshed with the rearwardmost gear tooth 334 so that further continued rotation of the gear in the same direction causes the bolt and gear teeth to mesh as a rack and pinion to drive the bolt rearwardly. After the bolt reaches its rearwardmost position reverse rotation of the gear causes a reverse operation, the bolt and gear teeth first cooperating to drive the bolt forwardly and the cam surfaces of the gear and bolt then cooperating to raise the rear end of the bolt to its locked position.

Figure 39:
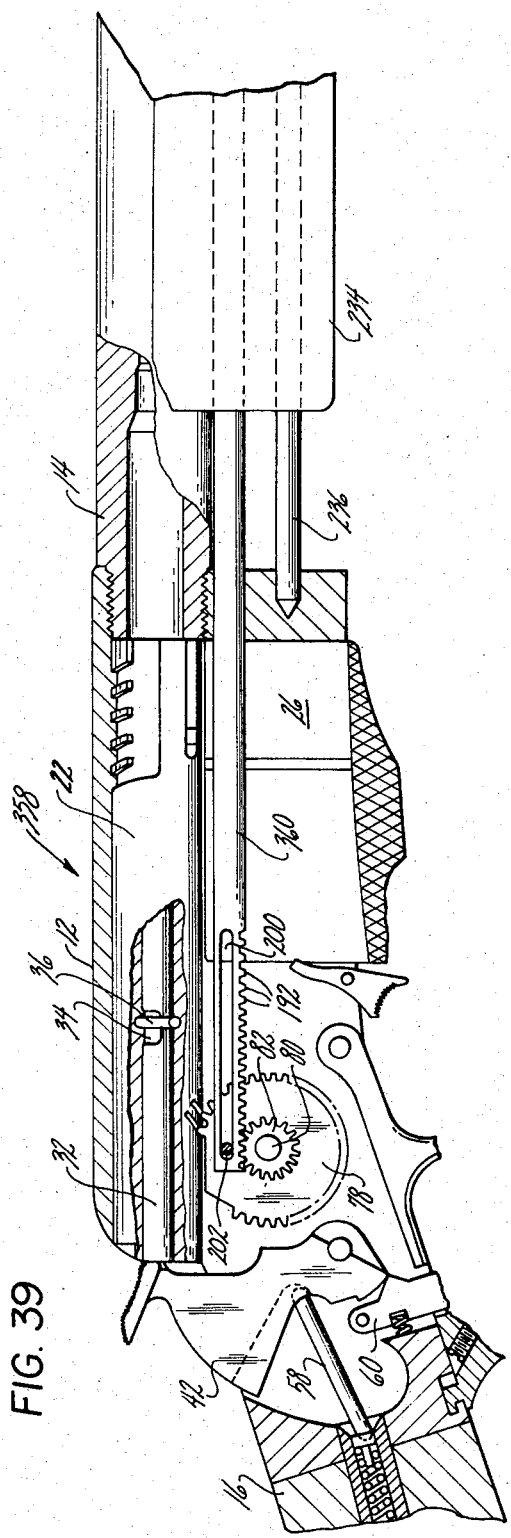
FIG. 39 is a vertical sectional view taken on a plane passing generally longitudinally through a firearm comprising still another embodiment of this invention.

FIG. 39 shows a firearm 358 embodying the present invention which is generally similar to the firearm 194 of FIG. 25 except that the actuating rod which operates the gear of the bolt operating mechanism is driven by a manually operable forearm 234 instead of by a gas pressure operated device. Considering the firearm 258, as shown in FIG. 39, the bolt operating mechanism includes an actuating rod 360 having a rack on the rear end thereof comprised of teeth 192, 192 which mesh with the teeth of the pinion 82. The actuating rod 360 is supported for reciprocating movement relative to the housing 12 and at its rear end is guided in this motion by a longitudinally extending slot 200 formed in the rod and a guide pin 202 received in the slot and fixed to the adjacent housing wall (not shown). The actuating rod 360 extends forwardly through the front wall of the housing 12 and is fixed to the forearm 234 which is supported for longitudinal sliding motion relative to the barrel 14 by the hanger rod 236. It will, therefore, be obvious that as the forearm 234 is reciprocated relative to the barrel 14 the actuating rod 360 is moved to rotate the pinion 82 and gear 78 and to thereby open and close and lock and unlock the bolt 22 in the manner previously described.

The invention claimed is:
1. In a bolt action firearm, the combination comprising a housing, a barrel having a firing chamber supported by said housing, said housing having a bolt recess located rearwardly of said barrel with its axis generally aligned with the axis of said barrel and also having a cartridge supply chamber communicating therewith along a portion of the length thereof, bolt means supported in said bolt recess for reciprocating movement relative to said housing between first and second positions along said bolt recess axis, said bolt means when in said first axial position being spaced sufficiently from said barrel to permit a cartridge to be moved generally sidewise from said cartridge supply chamber into said bolt recess and when in said second axial position being located closer to said barrel, a second recess in said housing communicating with said bolt recess, a driving element in said second recess supported for rotation about a first axis extending transversely of said housing, means drivingly connecting said driving element with said bolt means so as to reciprocate said bolt means in both axial directions between said first and second axial positions in response to rotation of said driving element in both directions of rotation about said first axis, a toothed pinion gear fixed relative to said driving element for rotation in unison therewith about said first axis, a manually operable lever in said second recess supported for movement relative to said housing about a second transverse axis spaced from said first axis, and a toothed gear segment fixed to said lever and meshing with said pinion gear within said second recess for positively rotating said pinion gear and said driving element about said first axis in response to movement of said lever about said second axis, said pinion gear having a smaller radius than said gear segment so that a given angular movement of said lever about said second axis results in a magnified angular movement of said driving element about said first axis to drive said bolt means at a rapid rate of reciprocation between said first and second axial positions, and stop means for limiting movement of said bolt means in both axial directions.

2. In a bolt action firearm, the combination comprising: a housing providing a cartridge supply chamber, a barrel having a firing chamber supported by said housing, said housing having a first recess located rearwardly of said barrel with its axis generally aligned with the axis of said barrel and also having a second recess located below and communicating with said first recess, a driven member received in said first recess and supported thereby for reciprocating movement relative to said housing between first and second positions along said first recess axis, said driven member when in said first axial position being spaced sufficiently from said barrel to permit a cartridge to be moved generally sidewise from said cartridge supply chamber into said first recess and when in said second axial position being located closer to said barrel, said driven member having thereon a set of teeth extending along a portion of its length, a first gear in said second recess supported for rotation relative to said housing about a first pivot axis located below said first recess and extending transversely of said housing and having a set of teeth thereon which mesh with said teeth on said driven member to positively drive said driven member in both axial directions between said first and second axial positions in response to rotation of said first gear in both directions of rotation relative to said housing, a toothed pinion gear fixed to said first gear, a manually operable lever supported for rotation relative to said housing about a second pivot axis spaced from said first pivot axis, a toothed gear segment fixed relative to said lever and meshing with said pinion gear for rotating the latter in response to the opening and closing movement of said lever relative to said housing, said pinion gear and said gear segment being so related that a given angular movement of said lever about said second axis results in a magnified angular movement of said first gear about said first axis to drive said driven member at a rapid rate of reciprocation between said first and second axial positions, and stop means for limiting movement of said driven member in both axial directions.

3. The combination defined in claim 2 further characterized by a firing mechanism including a trigger having a finger engageable portion normally located below said second recess, and said manually operable lever including a guard for said trigger.

4. The combination defined in claim 2 further characterized by coengageable locking means on said housing and on said driven member, said coengageable locking means when said driven member is in said second axial position being movable from an unlocked to a locked condition to restrain said driven member against movement from said second axial position to said first axial position, and coengageable means on said first gear and on said driven member for moving said coengageable locking means from said unlocked condition to said locked condition in response to further rotation of said first gear about said first axis after said driven member is moved from said first to said second axial position.

5. The combination defined in claim 2 further characterized by said stop means including a surface on the periphery of said first gear engageable with said driven member at a point adjacent one of said teeth on said driven member at one point in the rotation of said gear to prevent further rotation of said first gear in one direction and to thereby prevent further movement of said driven member in one axial direction.

6. In a bolt action firearm, the combination comprising, a housing, a barrel having a firing chamber supported by said housing, said housing including a bolt recess extending rearwardly from said barrel and a cartridge supply chamber communicating with said bolt recess, a bolt received in said bolt recess and supported for reciprocating movement relative to said housing between first and second positions along the axis of said recess and for angular movement relative to said housing about the axis of said recess between two angular positions, locking means on said housing and on said bolt shiftable between locked and unlocked conditions as a result of said angular movement of said bolt between said two angular positions when said bolt is in said second axial position for locking said bolt against reciprocating movement from said second to said first axial position, said bolt when in said first axial position being spaced sufficiently from said barrel to permit a cartridge to be moved from said cartridge supply chamber into said bolt recess and when in said second axial position being located closer to said barrel, said bolt having thereon a set of teeth extending along a portion of its length, a second recess in said housing communicating with said rearwardly extending bolt recess, a gear supported for rotation in said second recess relative to said housing and having a set of teeth thereon which mesh with said teeth on said bolt to move said bolt between said first and second axial positions in response to rotation of said gear relative to said housing, and coengaging means on said bolt and on said gear for rotating said bolt about the axis of said recess when said bolt is in said second axial position and in response to further rotation of said gear relative to said housing, said coengaging means on said bolt and on said gear including a projection fixed to one of said latter two parts, and a slot in the other of said latter two parts, said projection and slot being so arranged that said projection is moved into said slot as said bolt is moved from said first to said second axial position, said slot having such a shape that as said projection is moved therealong as a result of further rotation of said gear said projection engages one wall of said slot and cams said bolt angularly relative to said housing, and means for rotating said gear relative to said housing.

7. The combination defined in claim 6 further characterized by locking means on said bolt and on said housing which means are moved from an unlocked to a locked condition in response to the rotation of said bolt effected by said further rotation of said gear, said locking means in said locked condition serving to hold said bolt against reciprocating movement from said second to said first axial position.

8. In a bolt action firearm, the combination comprising: a housing providing a cartridge supply chamber, a barrel having a firing chamber supported by said housing, a bolt recess extending rearwardly of said barrel with its axis generally aligned with the axis of said barrel, a bolt means supported in said recess for reciprocating movement relative to said housing along said recess axis between first and second axial positions, said bolt means when in said first axial position being spaced sufficiently from said barrel to permit a cartridge to be moved generally sidewise from said cartridge supply chamber to said bolt bore and when in said second axial position being located closer to said barrel, said bolt means having thereon a set of teeth extending along a portion of its length, a second recess in said housing communicating with said rearwardly extending bolt recess, a first gear in said second recess supported for rotation relative to said housing about an axis fixed relative to said housing and having a set of teeth thereon which mesh with said teeth on said bolt means to positively drive said bolt means in both axial directions between said first and second axial positions in response to rotation of said first gear relative to said housing, a toothed pinion gear fixed to said first gear and located in said second recess, a forearm supported for reciprocating movement relative to said housing, and a rack extending into said second recess and fixed relative to said forearm and meshing with said pinion gear, said pinion gear having a substantially smaller radius than than first gear so that a given reciprocating movement of said forearm results in a magnified reciprocating movement of said bolt.

9. The combination defined in claim 8 further characterized by said first gear including a fixed stopping surface on its periphery engageable with said bolt at a point adjacent one of said teeth on said bolt at one point in the rotation of said first gear to prevent further rotation of said first gear in one direction and to thereby prevent further movement of said bolt in one diection.

10. In a bolt action firearm the combination comprising: a housing providing a cartridge supply chamber and a bolt bore communicating therewith, bolt means supported in said bolt bore for reciprocating movement along the axis of said bore between first and second axial positions and for angular movement about said axis between unlocked and locked angular positions, a barrel located adjacent said housing and having a firing chamber communicating and generally coaxial with said bolt bore, said bolt means when in its first axial position being axially spaced from said barrel sufficiently to permit a cartridge to be moved from said supply chamber to said bolt bore and when in its second axial position being located closer to said barrel so as to feed a cartridge positioned in said bore into said firing chamber as said bolt means is moved from said first to said second axial position, said bolt means having a set of teeth thereon which set of teeth extend along a portion of its length, said housing further including a recess communicating with said bolt, a gear supported in said recess for rotation relative to said housing and having a set of teeth thereon which mesh with said set of teeth on said bolt means, said teeth on said bolt means and on said gear having an angular relationship so as to move said bolt means between said first and second axial positions and between said two angular positions in response to rotation of said gear relative to said housing, and means for rotating said gear relative to said housing.

11. The combination defined in claim 10 further characterized by an angularly extending locking lug on said housing and a cooperating angularly extending locking lug on said bolt means which housing lug and bolt lug are moved into and out of locking relationship to lock said bolt against reciprocating movement to its first axial position as a result of angular movement of said bolt between said two angular positions.

12. The combination defined in claim 11 further characterized by said bolt means having a first radially extending surface arranged generally parallel to said bolt bore axis, and said housing lug including a first radially extending surface arranged generally parallel to said bolt bore axis and engageable with said first radially extending surface on said bolt to limit angular movement of said bolt in one direction.

13. The combination defined in claim 11 further characterized by said bolt means having a radially extending surface arranged generally perpendicular to said bolt bore axis, and said housing lug including a radially extending surface arranged generally perpendicular to said bolt bore axis and engageable with said radially extending surface on said bolt to limit reciprocating movement of said bolt in one direction.

14. The combination defined in claim 10 further characterized by said means for rotating said gear relative to said housing comprising a manually operable lever pivotally connected to said housing for oscillating movement between open and closed positions, a toothed pinion fixed to said gear in said recess, and a toothed gear segment in said recess fixed to said lever and meshing with said pinion, said pinion and said gear segment being so related that a given angular oscillation of said lever results in a magnified angular movement of said gear.

15. The combination defined in claim 14 further characterized by said recess being located below said bolt bore, a firing mechanism including a trigger having a finger engageable portion normally located below said recess, and said manually operable lever including a guard for said trigger.

16. The combination defined in claim 14 further characterized by a part on said lever engageable with said pinion to limit movement of said gear segment relative to said pinion in one direction.

17. The combination defined in claim 10 further characterized by said means for rotating said gear comprising an actuating member supported for reciprocating movement relative to said housing, and means pivotally connecting said actuating member with said gear.

18. The combination defined in claim 17 further characterized by said gear having a slot therein, and said means pivotally connecting said actuating member with said gear comprising a pin fixed to said actuating member and received in said slot.

19. The combination defined in claim 10 further characterized by said means for rotating said gear comprising an actuating member supported for reciprocating movement relative to said housing and having a rack thereon received in said recess, and a toothed pinion in said recess fixed to said gear and meshing with said rack, said pinion having a substantially smaller radius than said gear.

20. The combination defined in claim 19 further characterized by a forearm connected with said actuating member and adapted for manual reciprocation relative to said barrel.

21. The combination defined in claim 10 further characterized by said gear including a stopping surface on its periphery engageable with said bolt means at a point adjacent one of said teeth on said bolt means at one point in the rotation of said gear to prevent further rotation of said gear in one direction and to thereby prevent further movement of said bolt means in one direction.

22. In a bolt action firearm the combination comprising: a housing having a cartridge supply chamber, a barrel supported by said housing and having a firing chamber, said housing having a bolt recess extending rearwardly of said barrel and communicating with said firing chamber, a bolt supported in said recess for reciprocating movement relative to said housing along the axis of said recess between first and second axial positions, said bolt when in its first axial position being spaced sufficiently from said barrel to permit a cartridge to be moved sidewise from said cartridge supply chamber to said recess and when in its second axial position being located closer to said barrel so that a cartridge positioned in said recess is pushed into said firing chamber by said bolt as said bolt is moved from its first to its second axial position, said bolt having a set of teeth thereon which set of teeth extend along a portion of its length, a second recess in said housing communicating with said rearwardly extending bolt recess, a gear supported in said second recess for rotating about a transverse axis relative to said housing and having a set of teeth thereon which mesh with said set of teeth on said bolt to move said bolt from said first axial position to said second axial position in response to rotation of said gear in one direction from a first angular position to a second angular position, cooperating locking means on said housing and on said bolt which are movable between locked and unlocked conditions and which when in locked condition prevent movement of said bolt to its first axial position, means responsive to rotation of said gear in said one direction beyond said second angular position for moving said locking means from said unlocked to said locked condition, and means for rotating said gear.

23. The combination defined in claim 22 further characterized by said means for moving said locking means from said unlocked to said locked condition including means for rotating at least a part of said bolt in response to said rotation of said gear beyond said second angular position, and said cooperating locking means including at least one locking lug on said housing and at least one locking lug on that part of said bolt which is rotated by said rotation of said gear beyond said second angular position.

24. The combination defined in claim 22 further characterized by said barrel having a longitudinal bore extending therethrough, and by said means for rotating said gear relative to said housing including a pressure chamber communicating with said barrel bore so as to be exposed to the pressure of gases generated in said barrel bore during the firing of a cartridge, a piston in said pressure chamber movable generally longitudinally of said barrel, means biasing said piston toward a forward position relative to said barrel, said piston being arranged so as to be urged rearwardly by the application of pressurized gas to said chamber, and means operable in response to the movement of said piston for rotating said gear.

25. The combination defined in claim 24 further characterized by said means movable by said piston comprising a pinion on said gear, a rack meshing with said pinion and extending forwardly therefrom toward said piston, means biasing said rack forwardly toward said piston, said rack having a forward end loosely engageable with said piston to urge the same forwardly in said pressure chamber, said piston upon the application of pressure to said pressure chamber being driven rearwardly to move rearwardly said rack.

26. In a bolt action firearm the combination comprising: a housing, a barrel supported by said housing and having a firing chamber, said housing having a bolt recess extending rearwardly of said barrel and communicating with said firing chamber and also having a cartridge supply chamber communicating with said bolt recess, a bolt supported by said housing in said rearwardly extending recess for reciprocating movement relative to said housing along the axis of said recess between first and second axial positions and for angular movement relative to said housing between two angular positions, locking means on said housing and on said bolt shiftable between locked and unlocked conditions as a result of said angular movement of said bolt between said two angular positions when said bolt is in said second axial position for locking said bolt against reciprocating movement from said second to said first axial position, said bolt when in its first axial position being spaced from said barrel sufficiently to permit a cartridge to be moved sidewise from said cartridge supply chamber into said bolt recess and when in its second axial position being located closer to said barrel so that a cartridge positioned in said bolt recess is pushed into said firing chamber by said bolt as said bolt is moved from its first to its second axial position, said bolt having thereon a first set of generally transverse teeth extending along a portion of its length and a second set of teeth located adjacent one end of said first set of teeth and inclined relative to said axis of said bolt recess, said housing having a second recess communicating with said rearwardly extending bolt recess, a gear supported in said second recess for rotation relative to said housing and having a first set of teeth thereon which mesh with said first set of teeth on said bolt to move said bolt between said first and second axial positions, and a second set of teeth on said gear located adjacent one end of said first set of teeth thereon and which mesh with said second set of bolt teeth to move said bolt between said two angular positions in response to rotation of said gear relative to said housing, and means for rotating said gear relative to said housing.

27. The combination defined in claim 26 further characterized by said bolt being of generally circular cross-section, and by the teeth comprising said first set of teeth on said bolt and said first set of teeth on said gear being of such shape as to prevent rotation of said bolt relative to said housing as said bolt is moved between said first and second axial positions.

28. The combination defined in claim 26 further characterized by the teeth of said second set of teeth on said bolt extending a substantial distance angularly about said longitudinal bolt axis.

29. In a bolt action firearm, the combination comprising: a housing, a barrel located adjacent said housing and having a firing chamber, said housing having a bore extending rearwardly of said barrel and communicating with said firing chamber and also having a cartridge supply chamber communicating with said bore, a bolt supported in said housing bore for reciprocating movement relative to said housing along the axis of said bore between first and second axial positions and for movement in another manner relative to said housing between a locked and an unlocked position, said bolt when in its first axial position having its forward end spaced from the rear end of said barrel by a distance sufficient to permit a cartridge to be moved sidewise from said cartridge supply chamber into said housing bore and when in its second axial position having its forward end located closer to said barrel so that a cartridge positioned in said bore is pushed into said firing chamber by said bolt as said bolt is moved from its first to its second axial position, coengageable locking means on said housing and on said bolt for restraining said bolt against movement from said second axial position to said first axial position when said bolt is in said locked position, said locking means comprising means defining at least one generally forwardly facing first abutment surface fixed relative to said housing and extending generally radially relative to the longitudinal axis of said bolt and means defining at least one generally rearwardly facing and radially extending second abutment surface on said bolt which second abutment surface is substantially axially aligned with said first abutment surface on said housing when said bolt is in said second axial position, said bolt having thereon a set of teeth located in a zone extending along a portion of its length and which teeth are arranged generally perpendicular to a plane passing through said housing bore axis, a recess in said housing communicating with said housing bore, a gear in said recess supported for rotation relative to said housing and having a first set of teeth thereon which mesh with said teeth on said bolt to move said bolt between said first and second axial positions in response to rotation of said gear relative to said housing, coengaging means on said gear and on said bolt for moving said bolt from said unlocked to said locked position in response to further rotation of said gear after said bolt is moved from said first axial position to said second axial position, and means for rotating said gear relative to said housing.

30. The combination defined in claim 29 further characterized by said locking means comprising cooperating lugs on said housing and on said bolt which lugs are brought into and out of locked relationship in response to rotation of said bolt about said housing bore axis when said bolt is in said second axial position, and said coengaging means on said bolt and on said gear for moving said bolt from said unlocked to said locked position comprising a set of inclined teeth on said bolt and a cooperating set of inclined teeth on said gear.

31. The combination defined in claim 29 further characterized by said locking means comprising cooperating lugs on said housing and on said bolt which lugs are brought into and out of locked relationship in response to rotation of said bolt about said housing bore axis when said bolt is in said second axial position, and said means for moving said bolt from said unlocked to said locked position comprising a groove in said bolt adjacent one end of said set of teeth on said bolt and a radially outwardly extending projection on said gear adjacent one end of said set of teeth on said gear, said projection being arranged to move into said slot in response to said further rotation of said gear and said slot including a portion inclined relative to the longitudinal axis of said bolt so that as said projection is moved through said slot portion said projection moves said bolt angularly relative to said housing.

32. The combination defined in claim 29 further characterized by said first and second abutment surfaces being located on one side of said bolt, said coengaging means on said gear and on said bolt for moving said bolt from said unlocked to said locked condition in response to further rotation of said gear comprising coengageable cam surfaces on said gear and on said bolt for moving said bolt out of axial alignment with said bolt bore after said bolt is moved from said first position to said second position to bring said first and second abutment surfaces into overlapped relation with one another, and biasing means for resiliently urging said bolt towards axial alignment with said housing bore.

33. In a bolt action firearm, the combination comprising: a housing providing a cartridge supply chamber, a barrel supported by said housing and having a firing chamber in the rear end thereof, said housing further including a rearwardly extending bolt recess communicating with said firing chamber and with said cartridge supply chamber and also including a second recess communicating with said bolt recess, a bolt supported in said bolt recess for reciprocating movement relative to said housing along the axis of said bolt recess between first and second axial positions and for angular movement relative to said housing and about said axis between two angular positions, locking means on said housing and on said bolt shiftable between locked and unlocked conditions as a result of said angular movement of said bolt between said two angular positions when said bolt is in said second axial position for locking said bolt against reciprocating movement from said second to said first axial position, said bolt when in its first axial position having its forward end spaced from the rear end of said barrel to permit a cartridge to be moved sidewise from said cartridge supply chamber into said bolt recess and when in its second axial position having its forward end located closer to said rear end of said barrel, so that a cartridge positioned in said bolt recess is moved into said firing chamber by said bolt as said bolt is moved from its first axial position to its second axial position, said bolt having thereon a first set of teeth the teeth of which first set are inclined relative to said bolt recess axis and located in zone extending along a portion of the length of said bolt, said bolt also having thereon a second set of teeth the teeth of which second set are located adjacent to one end of said first set of teeth and are similarly inclined relative to said bolt recess axis, a gear supported in said second recess for rotation relative to said housing and having a first set of teeth thereon which mesh with said first set of teeth on said bolt to move said bolt between said first and second axial positions and a second set of teeth which mesh with said second set of teeth on said bolt to move said bolt between said two angular positions in response to rotation of said gear relative to said housing, guide means between said housing and said bolt for restraining said bolt to a predetermined path of movement relative to said housing, and means for rotating said gear relative to said housing.

34. The combination defined in claim 33 further characterized by said guide means for restraining said bolt to a predetermined path of movement relative to said housing including a guide groove in said bolt and a guide projection fixed to said housing and received in said guide groove so as to engage a sidewall of said groove throughout at least a part of said path of movement.

35. The combination as defined in claim 34 further characterized by said guide groove including a first portion extending generally longitudinally of said bolt in a straight fashion and a second portion extending generally angularly thereof, said guide projection being received in said first portion of said guide groove during movement of said bolt between its first and second axial positions and being received in said second portion of said guide groove during rotation of said bolt between its two angular positions.

References Cited
UNITED STATES PATENTS

| | | | |
|---|---|---|---|
| 86,971 | 2/1869 | Conklin | 42—16.4 |
| 289,972 | 12/1883 | Burgess | 42—17 |
| 785,085 | 3/1905 | Burton | 42—16.3 X |
| 1,003,790 | 9/1911 | Pordon et al. | 42—16.3 |
| 1,215,255 | 2/1917 | Davison | 89—1.702 |
| 1,520,515 | 12/1924 | Storer | 42—16.15 |
| 2,941,449 | 6/1960 | Reed | 42 16.1 |

SAMUEL W. ENGLE, *Primary Examiner.*

UNITED STATES PATENT OFFICE
CERTIFICATE OF CORRECTION

Patent No. 3,377,730

April 16, 1968

Karl R. Lewis

It is certified that error appears in the above identified patent and that said Letters Patent are hereby corrected as shown below:

Column 15, line 17, "164" should read -- 264 --.
Column 21, line 33, "than" should read -- said --; line 42, "diection" should read -- direction --; line 62, after "bolt" insert -- bore --.

Signed and sealed this 4th day of November 1969.

(SEAL)
Attest:

Edward M. Fletcher, Jr.
Attesting Officer

WILLIAM E. SCHUYLER, JR.
Commissioner of Patents